United States Patent
Campos et al.

(10) Patent No.: US 9,319,257 B2
(45) Date of Patent: Apr. 19, 2016

(54) MULTIPLE-INPUT MULTIPLE-OUTPUT (MIMO) COMMUNICATION SYSTEM

(71) Applicant: Cable Television Laboratories, Inc., Louisville, CO (US)

(72) Inventors: Luis Alberto Campos, Superior, CO (US); Jennifer Andreoli-Fang, Boulder, CO (US); Joey Padden, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/181,640

(22) Filed: Feb. 15, 2014

(65) Prior Publication Data

US 2014/0233678 A1    Aug. 21, 2014

Related U.S. Application Data

(63) Continuation-in-part of application No. 13/769,288, filed on Feb. 16, 2013.

(60) Provisional application No. 61/845,340, filed on Jul. 11, 2013.

(51) Int. Cl.

| | | |
|---|---|---|
| *H04L 27/00* | (2006.01) | |
| *H04L 27/12* | (2006.01) | |
| *H04B 7/04* | (2006.01) | |
| *H04B 7/02* | (2006.01) | |
| *H04B 7/06* | (2006.01) | |
| *H04B 7/10* | (2006.01) | |
| *H04W 72/00* | (2009.01) | |

(52) U.S. Cl.
CPC .............. *H04L 27/12* (2013.01); *H04B 7/0413* (2013.01); *H04B 7/022* (2013.01); *H04B 7/0691* (2013.01); *H04B 7/10* (2013.01); *H04W 72/00* (2013.01)

(58) Field of Classification Search
CPC ...... H04L 27/12; H04L 27/26; H04B 7/1413; H04B 7/0691; H04B 7/10; H04B 7/022; H04W 72/00
USPC ......... 375/299, 260, 262, 267, 232, 295, 329, 375/340; 455/318, 452.1, 456.1
See application file for complete search history.

(56) References Cited

U.S. PATENT DOCUMENTS

| 5,185,763 A | 2/1993 | Krishnan |
|---|---|---|
| 5,504,783 A | 4/1996 | Tomisato et al. |

(Continued)

FOREIGN PATENT DOCUMENTS

| WO | 2005/062498 | 7/2005 |
|---|---|---|
| WO | 2011/161637 | 12/2011 |

OTHER PUBLICATIONS

International Search Report (ISR) and Written Opinion of corresponding PCT application.

*Primary Examiner* — Dhaval Patel

(74) *Attorney, Agent, or Firm* — Great Lakes Intellectual Property, PLLC

(57) ABSTRACT

A multiple-input multiple-output (MIMO) capable system is contemplated. The communication system may include a signal processor configured to separate an input stream into multiple signal paths to facilitate simultaneous transport through a communication medium. The capability to simultaneously transmit multiples signal paths may be beneficial in order to maximize throughput and/or minimize expense.

19 Claims, 14 Drawing Sheets

(56) References Cited

U.S. PATENT DOCUMENTS

| | | |
|---|---|---|
| 5,561,686 A | 10/1996 | Kobayashi et al. |
| 5,749,857 A | 5/1998 | Cuppy |
| 6,941,079 B1 * | 9/2005 | Barozzi et al. ............... 398/157 |
| 6,944,120 B2 | 9/2005 | Wu et al. |
| 7,391,832 B2 * | 6/2008 | Catreux-Erces et al. ..... 375/349 |
| 8,223,872 B1 | 7/2012 | Zhang |
| 2002/0122398 A1 | 9/2002 | Jou |
| 2002/0126338 A1 | 9/2002 | Volpi et al. |
| 2004/0037565 A1 | 2/2004 | Young et al. |
| 2005/0063340 A1 | 3/2005 | Hoffmann |
| 2005/0105632 A1 | 5/2005 | Catreux-Erces et al. |
| 2005/0174935 A1 | 8/2005 | Segel |
| 2006/0234663 A1 | 10/2006 | Wilhoyte |
| 2007/0032220 A1 | 2/2007 | Feher |
| 2007/0054625 A1 | 3/2007 | Beale |
| 2009/0028192 A1 | 1/2009 | Rieger et al. |
| 2009/0204877 A1 | 8/2009 | Betts et al. |
| 2010/0035600 A1 | 2/2010 | Hou et al. |
| 2010/0285769 A1 * | 11/2010 | Conroy et al. ................ 455/318 |
| 2011/0019723 A1 | 1/2011 | Lerner |
| 2011/0080979 A1 | 4/2011 | Duggan |
| 2011/0243025 A1 | 10/2011 | Kim |
| 2012/0206285 A1 * | 8/2012 | Khlat ............................ 341/155 |
| 2012/0236971 A1 | 9/2012 | Taghavi Nasrabadi et al. |
| 2012/0281621 A1 | 11/2012 | Lotfallah |
| 2012/0331111 A1 | 12/2012 | Wu et al. |
| 2013/0016966 A1 | 1/2013 | Jansen et al. |
| 2013/0076566 A1 | 3/2013 | Jiang et al. |
| 2013/0201316 A1 | 8/2013 | Binder et al. |
| 2013/0215833 A1 | 8/2013 | Ong et al. |
| 2013/0216228 A1 * | 8/2013 | Nazarathy et al. .............. 398/65 |
| 2013/0308950 A1 | 11/2013 | Blouza et al. |
| 2014/0066098 A1 | 3/2014 | Stern et al. |
| 2014/0177745 A1 | 6/2014 | Krishnamurthy et al. |
| 2014/0206367 A1 | 7/2014 | Agee et al. |
| 2014/0219267 A1 | 8/2014 | Eyuboglu et al. |
| 2014/0233678 A1 | 8/2014 | Campos et al. |
| 2014/0241446 A1 | 8/2014 | Zhang et al. |
| 2014/0270776 A1 | 9/2014 | Jinno et al. |
| 2014/0294393 A1 | 10/2014 | Lowery et al. |
| 2014/0302802 A1 | 10/2014 | Chang et al. |
| 2014/0321565 A1 * | 10/2014 | Campos et al. ............... 375/267 |
| 2014/0342659 A1 | 11/2014 | Maharajh et al. |

* cited by examiner

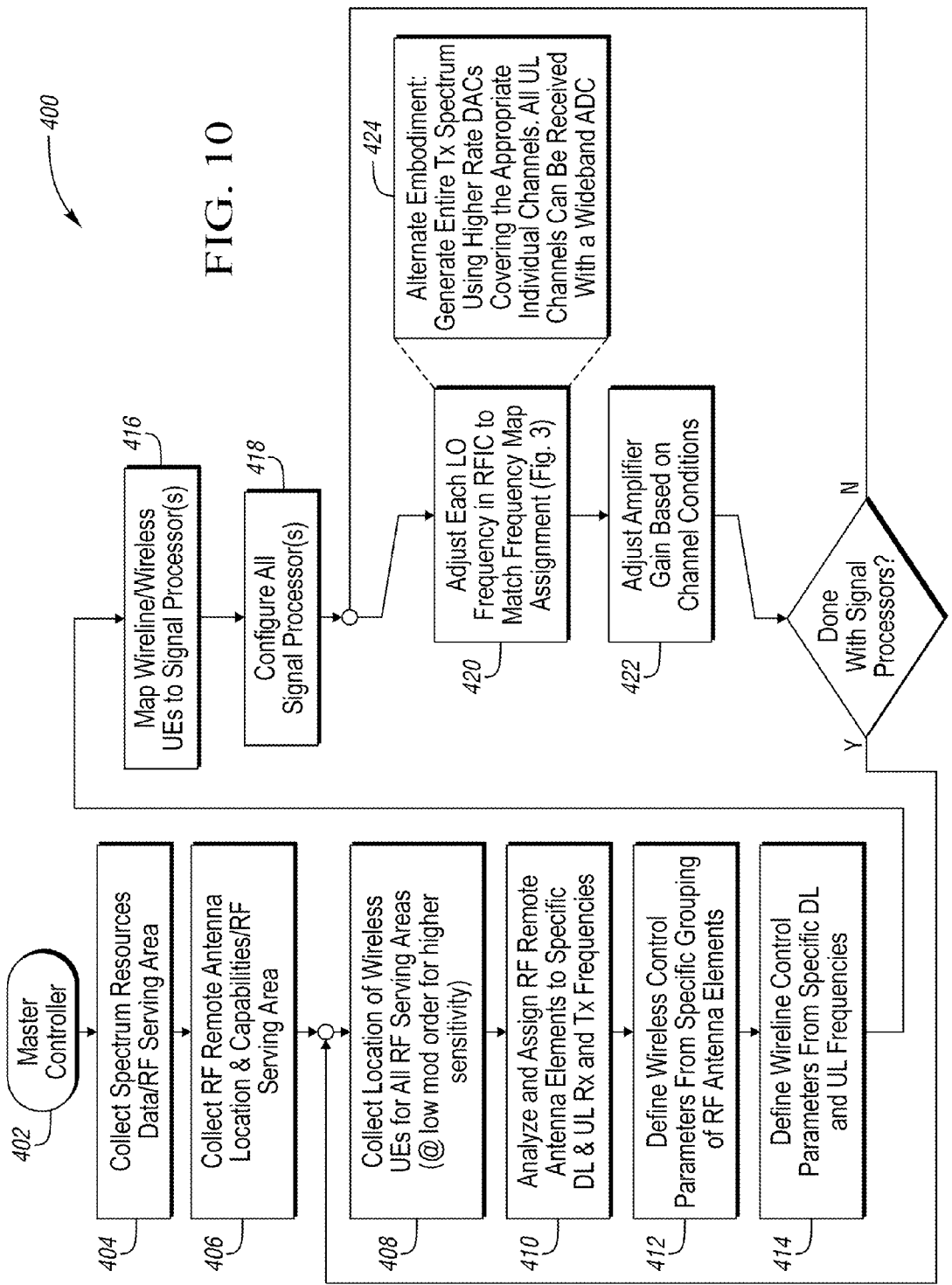

MULTIPLE-INPUT MULTIPLE-OUTPUT (MIMO) COMMUNICATION SYSTEM

CROSS-REFERENCE TO RELATED APPLICATIONS

This application is a continuation-in-part of U.S. application Ser. No. 13/769,288, filed Feb. 16, 2013, and claims the benefit of U.S. provisional application No. 61/845,340 filed Jul. 11, 2013, the disclosures of which are incorporated in their entirety by reference herein.

TECHNICAL FIELD

The present invention relates to communication systems and signal processors, such as but not necessarily limited to those capable of facilitating multiple-input multiple-output (MIMO) or multipath communications.

BACKGROUND

Wireless communications systems may employ multiple-input multiple-output (MIMO) techniques to facilitate multipath communications. The multipath capabilities of MIMO systems allow data to be transmitted simultaneously over multiple paths between a plurality of transmitting devices and a plurality of receiving devices to effectively increase capacity over single path systems.

BRIEF DESCRIPTION OF THE DRAWINGS

FIG. 10 illustrates a flowchart of a method for controlling a signal processor to facilitate wireless signaling in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
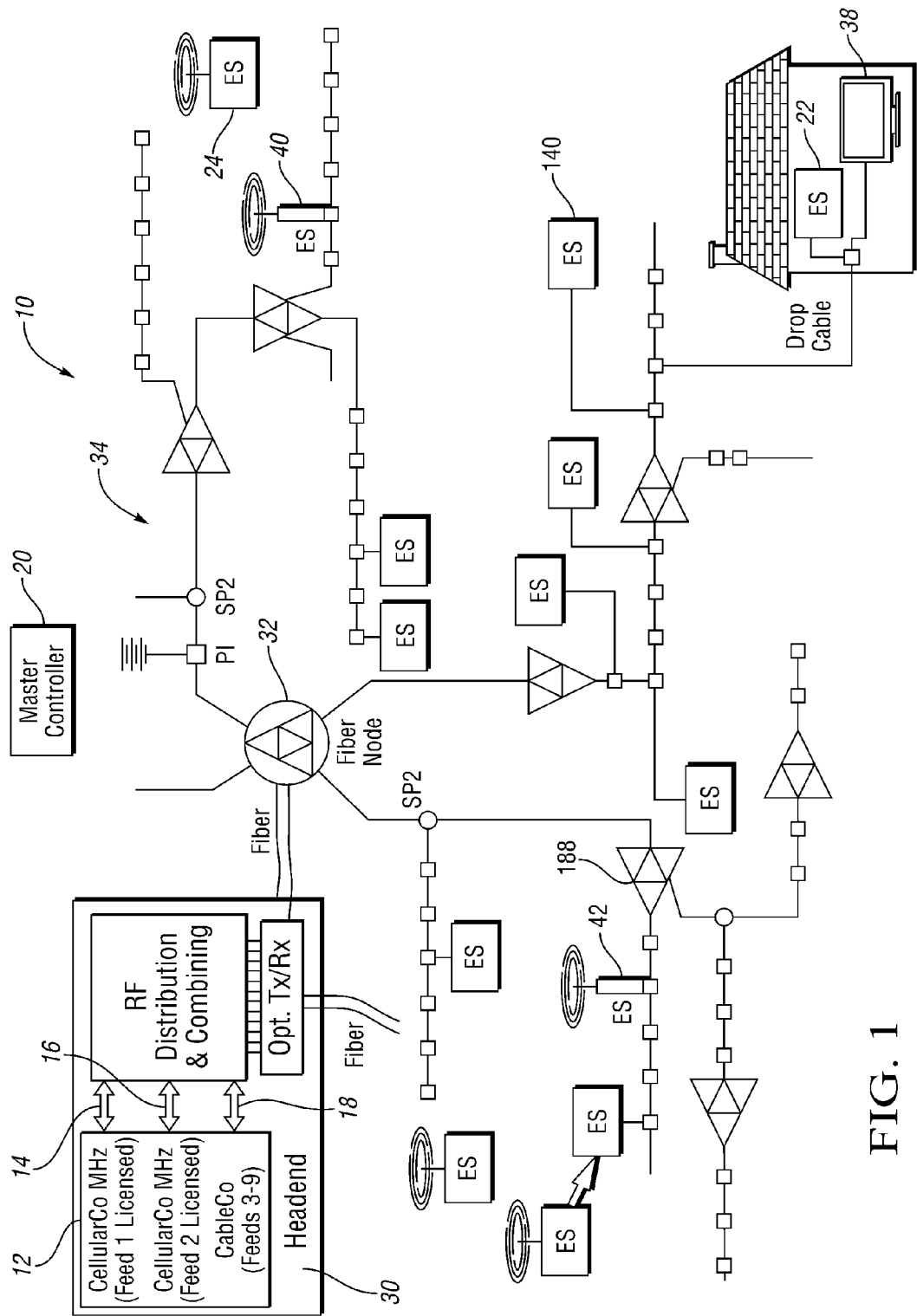
FIG. 1 illustrates a multiple-input multiple-output (MIMO) communication system in accordance with one non-limiting aspect of the present invention.

FIG. 1 illustrates a multiple input multiple output (MIMO) communication system 10 in accordance with one non-limiting aspect of the present invention. The system 10 may be configured to facilitate electronic signaling between a signal processor 12 and one or more end stations (ES), user equipment (UE), access points (APs), terminals or other devices. The signal processor 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. The communication system 10 is illustrated with respect to the signal processor 12 supporting a first feed 14, a second feed 16, a third feed 18 (representing seven independent feeds), although more or less feeds may be received for transport. Each feed 14, 16, 18 may include data communicated to the signal processor 12 from a local or remote sourcing device/entity as a baseband or other suitable signal. Each feed may be processed for transport with the signal processor 12, optionally with the signal processor 12 comprising separate or independent signal processors for each feed. The first and second feeds 14, 16 may be associated with cellular related signaling (e.g., signaling associated with a cellular phone call) and the third feed 18 may be associated with cable related signaling (e.g., signaling associated with delivery of a television program and/or Internet data download). A master controller 20 may be included as a standalone component and/or integrated into one of the illustrated components in order to facilitate the operations contemplated herein.

The end stations ES correspond with any electronically operable device having capabilities sufficient to facilitate directly or indirectly interfacing a user with signaling transported through the communication system 10. The end stations ES may be a gateway, a router, a computer, a mobile phone, a cellular phone, a media terminal adapter (MTA), a voice over Internet protocol (VoIP) enabled device, a television, a set top box (STB), network address translator (NAT), etc. For exemplary non-limiting purposes, a first end station 22 is shown to be a wireline type of device, such as a home gateway or set-top box configured to output signaling to a television or other device through a wireless and/or wired connection, and a second end station 24 is shown to be a wireless type of device, such as a remote antenna unit, wireless computer, television or cellular phone, optionally having capabilities sufficient to interface signaling using a wireless and/or a wired connection, such as the manner described in U.S. patent application Ser. No. 14/181,641, entitled Multiple-Input-Multiple-Output (MIMO) Communication System, filed Feb. 15, 2014, the disclosure of which is hereby incorporated by reference in its entirety. The use of such first and second end stations 22, 24 may be beneficial in facilitating continued access to a television program while a user travels between locations associated with the first and second ends stations 22, 24. Seamless access to the content may be provided in this manner using different ends stations or capabilities of the end stations, e.g., a wireless capability of the second end station 24 may be used when at one location and a wireline capability of the first end station 22 may be used when at another location.

The present invention contemplates distinguishing between wireless and wireline communications. The wireline communications may correspond with any type of electronic signal exchange where a wire, a coaxial cable, a fiber or other bound medium is used to facilitate or otherwise direct at least a portion of the related signaling, including the signaling exchanged outside of the communicating device/processor. The wireline communications include but are not necessarily limited to those carried at least partially over a fiber/cable backbone associated with a cable television distribution system or an Internet or non-Internet based data communication system. The wireless communications may correspond with any type of electronic signal exchange where an antenna, antenna port or other transmitting type of device is used to communicate at least a portion of the signaling as radio frequency (RF) signals, such as over a wireless link or through an unbound or air medium, optionally in the manner described in U.S. patent application serial number. The wireless communications include but are not necessary limited to satellite communications, cellular communications and Wi-Fi communications. The use of wireline and wireless communications and the corresponding mediums are not intended to limit the present invention to any particular type of medium, protocol, or standard and is instead noted to differentiate between two types of communications, e.g., bound and unbound.

The signaling desired for transports through the communication system 10 may be received at a headend unit 30 associated with the signal processor 12 and thereafter carried by one or more fibers to a fiber node 32. The fiber node 32 may be part of a cable television distribution system 34 from which a plurality of coaxial cables may facilitate further delivery to different geographical areas, optionally with use of splitters and/or amplifiers. The coaxial cables are shown to include a plurality of taps (shown as rectangles) through which various end stations ES may be connected to receive the wireline signaling and/or other signaling associated with the headend, e.g., signaling associated with other types of content and/or data transmissions. The first end station 22 is shown to be connected to one of the taps to facilitate interfacing transported signals to a locally connected, first user equipment (UE) 38. Using LTE over HFC, communications between end station 22 and UE 38 can take place through the signal processor 12 but not directly. Communications between end station 22 and UE 38 can take place directly if other means of communications are used such as WiFi or MoCA or Ethernet. Communications between end station 22 and UE 38 can also take place using LTE over HFC but over a separate system where end station 22 also has signal processor functionality and the UE 38 functions as an end station of this local "home LTE over HFC network". The first end station 22 may be configured to facilitate processing of frequency diverse signals for wireline and/or wireless communication to the UE 38, which is shown to be a television but could be any other type of device, such as a mobile phone, tablet, etc. having capabilities sufficient to access television or data signaling using one or both of a wired and wireless connection. The first end station 22 may be configured to facilitate interfacing transported signals with the first UE 38 by converting frequency diverse signaling to an output signaling stream usable by the UE 38.

A third end station 40 is shown to be configured to facilitate wirelessly signaling with the second end station 24. The third end station 40 may be configured to convert the frequency diverse signals carried over the wireline distribution system 34 to spatially diverse signals or other suitable types of RF signals. The third end station 40 may be included as part of a Wi-Fi access point, a router, a cellular tower, a base station, etc. The ability of the third end station 40 to output wireless signaling may be beneficial if licensing or other restrictions limit how the wireless signals can be transmitted from the third end station 40, e.g., frequency usage restrictions may prevent output of the frequency diverse signals carried over the distribution system 34 to the second end station 24 without being pre-processed by the third end station 40. The third end station 40 may be configured to pre-process the frequency diverse signals carried over the distribution system 34 to suitable wireless signals having other frequency characteristics licensed for use with the second end station 24.

The third end station 40 may be configured to convert received wireline signaling to wireless signaling suitable to any restrictions associated with the second end station 24. The third end station 40 may be useful in allowing a user to access content through different types of devices and/or to facilitate use of other wireless transmission frequencies and communication mediums. The third end station 40 may be configured to facilitate output of spatially diverse signals according to frequency ranges allocated to an originator of the corresponding signaling stream. The second end station 24 may be a handset, mobile phone or other device having capabilities sufficient to process spatially diverse signaling, such as to facilitate interfacing a cellular phone call with the user (additional processing may be done at the second end station 24 to facilitate the phone call or other operation desired for the signaling stream). A fourth end station 42 may be configured to facilitate wireles sly interfacing transported signaling with the second end station 24, such as to enhance spatial diversity of the interfaced wireless signal in the manner described below in more detail.

Figure 2A:
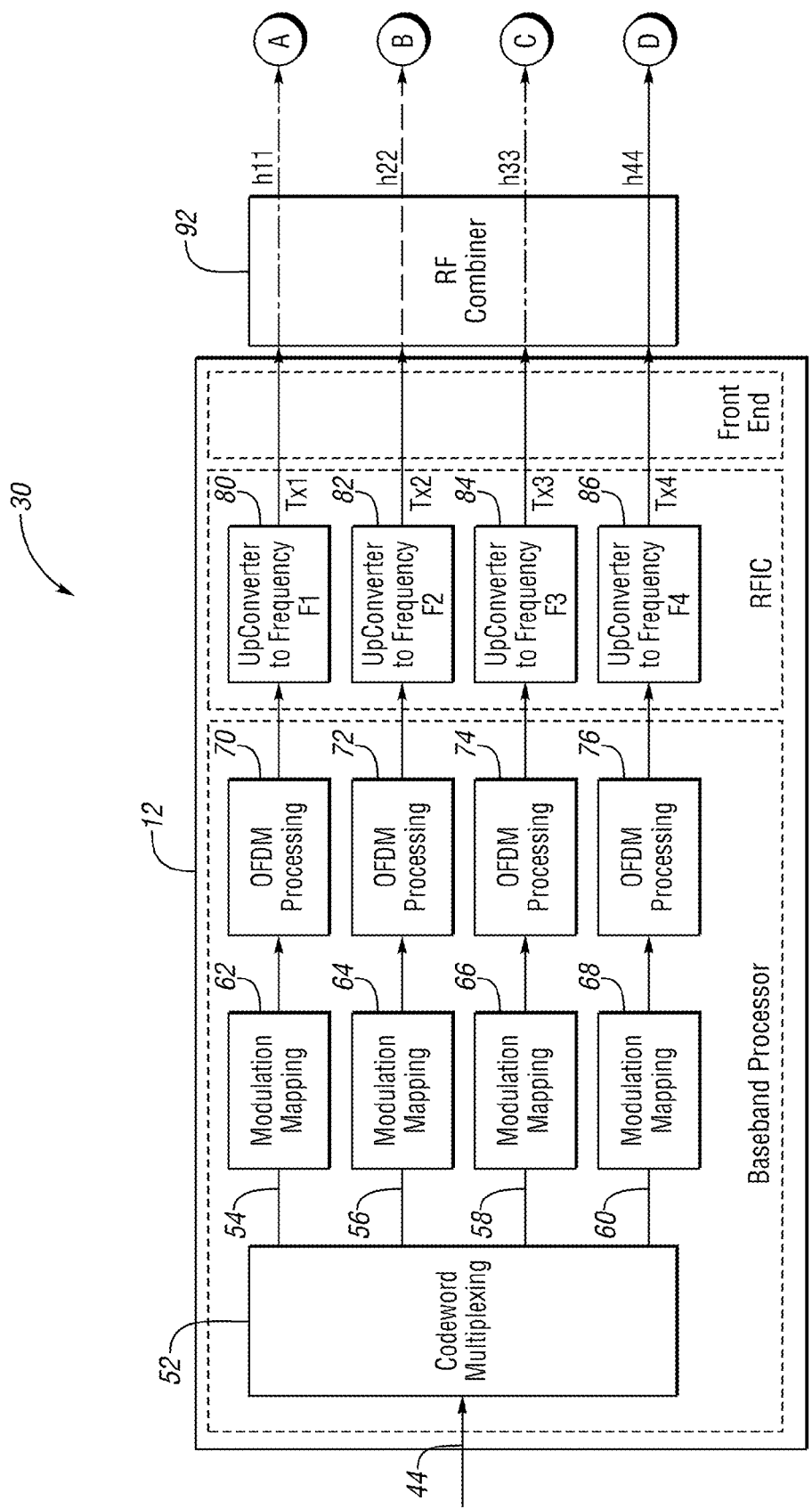
FIGS. 2a-2b schematically illustrate operation of the communication system when facilitating a wireline signaling mode in accordance with one non-limiting aspect of the present invention.
Figure 2B:
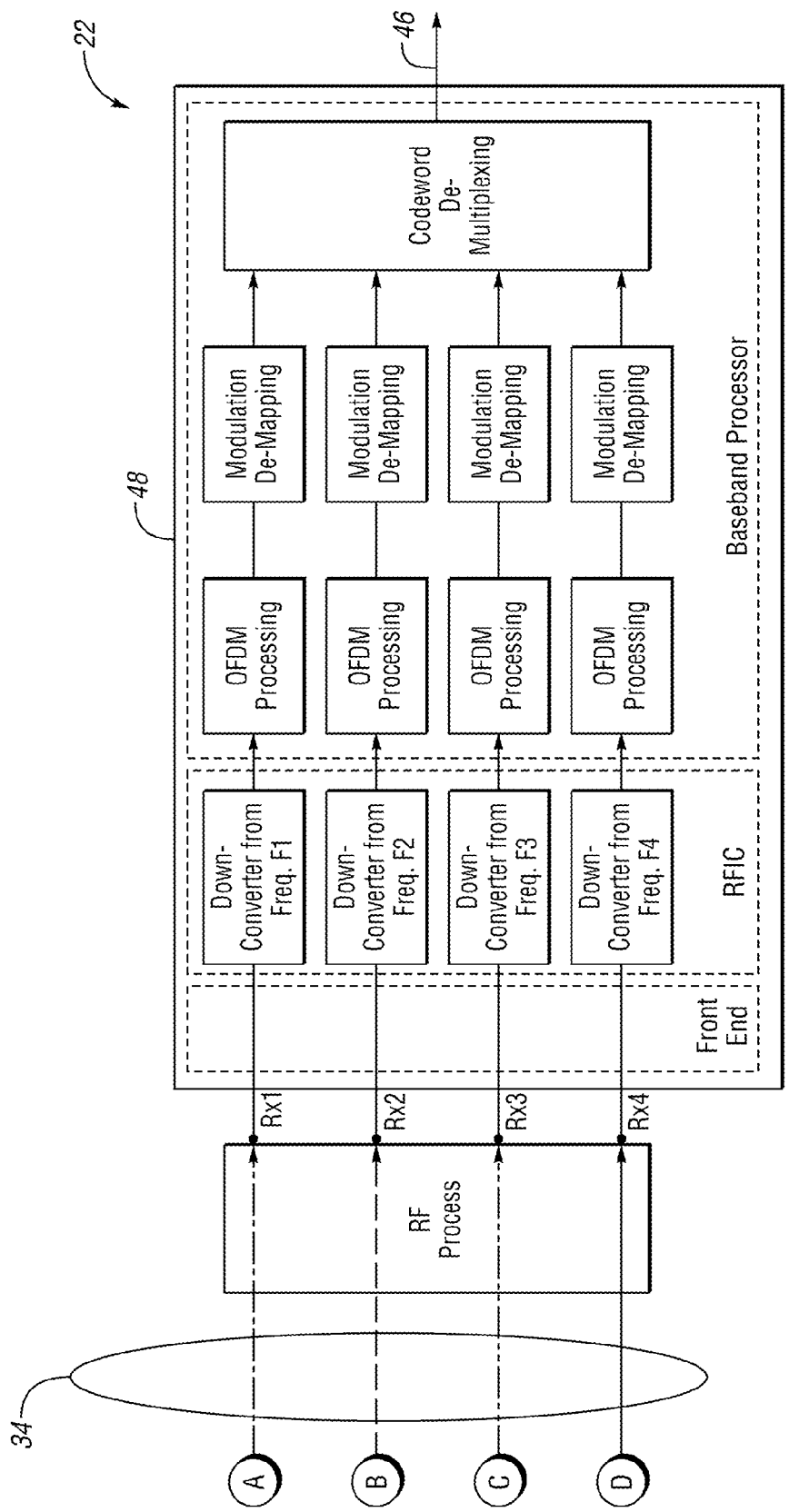

FIGS. 2a-2b schematically illustrate operation of the communication system 10 when facilitating a wireline signaling mode in accordance with one non-limiting aspect of the present invention. The wireline signaling mode corresponds with the signal processor 12 receiving an input signal 44, processing the input signal for transmission over at least a portion of the wireline communication medium 34, and the first end station 22 processing the transmitted signaling into an output signal 46. The output signal 46 may be subsequently transmitted to the first UE 38 or other device for final use. The signal processor 12 may be configured to receive the input signal from a base station, eNodeB, signal processor or other processing element desiring to transport signaling over the communication system (e.g., one of the feeds 14, 16, 18). The base station may be associated with an Internet service provider, a cable television sourcing entity, cellular phone provider or other source capable of providing data to the signal processor 12 for transport. The input signal 44 may be in the form of a baseband signal, a non-continuous wave (CW) type of signal and/or some other signaling/streaming sufficient to represent data, e.g. data represented using binary data bits/bytes and varying voltages or optical intensities. Optionally, the input signal 44 may be a non-diverse signal at least in that the data is carried within a single stream/signal as opposed to being divided for transmission using frequency diverse signaling and/or spatially diverse signaling.

The communication system 10 may be configured to facilitate transport of the input signal 44 (input data, message, video, audio, etc.) from an originating address associated with the sourcing entity to a destination address associated with the first UE 38 (or other end station). The present invention contemplates the signal processor 12 being configured to convert the input signal 44 to an intermediary signal prior to providing long-haul transport of the intermediary signal over one or more of the contemplated communication mediums so that the intermediary signal can be re-processed with another signal processor, such as with a signal processor 48 of the first end station 22 that converts the intermediary signal to the output signal 46, e.g., in the manner described in U.S. patent application Ser. No. 14/181,643, entitled Multiple-Input-Multiple-Output (MIMO) Communication System, filed Feb. 15, 2014, the disclosure of which is hereby incorporated by reference in its entirety. In this manner, the output signal 46 may take the same form as the input signal 44 prior to being processed with the first signal processor 12. Optionally, the second signal processor 48 may be configured to generate the output signal 46 as a different type of signal. The signal 46 as it comes out of signal processor 48 may not be frequency or spatially diverse, e.g., signal 46 may need another processor like 12 to regenerate back spatial or frequency diverse signals. This would most likely be to implement a home "LTE over HFC" network that extends from the larger coverage LTE over HFC access network. Another way of extending frequency or spatially diverse signals may include using an end station similar to end station 40 and converting to spatially or frequency diverse signals without use of a signal processor similar to the processor 48. The second signal processor 48 may be configured to assess the signaling capabilities of the first UE 38 and to adjust the characteristics of the output signal 46 to operate with the capabilities of the first UE 38.

The first signal processor 12 may include a codeword multiplexing device 52. The codeword multiplexing device 52 may be configured to multiplex the input signal 44 into a plurality of signal parts 54, 56, 58, 60. The codeword multiplexing device 52 is shown to be configured for non-limiting purposes to multiplex the input signal 44 into a first signal part 54, a second signal part 56, a third signal part 58 and a fourth signal part 60. The codeword multiplexer 52 may be configured to facilitate encoding the signal parts 54, 56, 58, 60 in/with codewords in order to enable additional robustness through addition of parity information. The codeword multiplexing device 52 may add extra bits to each signal part 54, 56, 58, 60 to increase robustness and the capability to reconstruct the original signal in case bits from one or more of the signaling parts 54, 56, 58, 60 are lost during communication. In a very benign environment, processing provided by the codeword multiplexing device 52 may be foregone, however, many applications, and in particular in MIMO, may practically require the additional robustness provided with the codewords. The use of four signal parts 54, 56, 58, 60 is believed to be beneficial as the particular implementation contemplates facilitating MIMO operations where the split parts correspond to four independent antenna ports. The codeword multiplexing device 52 may be configured to divide the input signal 44 into each of the signal parts 54, 56, 58, 60 such that each signal part 54, 56, 58, 60 carries at least a different portion of the input signal 44.

The signal processor 12 may include a plurality of modulation mapping devices 62, 64, 66, 68. The modulation mapping devices 62, 64, 66, 68 may be configured to format a received one of the first, second, third and fourth signal parts 54, 56, 58, 60 with respect to a constellation symbol. The mapping devices 62, 64, 66, 68, for example, may take a digital stream and convert that information into coordinate values defining different constellation symbols. The constellation symbols may correspond with a transport mechanism used within the communication system 10 to facilitate scheduling long-haul transmissions over the wireline communication 34, such as the constellation symbols associated with the MAP disclosed in U.S. patent application Ser. No. 12/954,079, the disclosure of which is hereby incorporated by reference in its entirety. In this manner, the modulation mapping devices 62, 64, 66, 68 may be configured to facilitate manipulating the data received from the codeword multiplexer 52 for actual transmission within the system 10. The modulation mapping devices 62, 64, 66, 68 may be configured to map or otherwise associate the bits/bytes output from the codeword multiplexer 52 with particular time periods and/or frequencies or other coordinates associated with transmission through the communication medium 34.

The signal processor 12 may include a plurality of orthogonal frequency division multiplexing (OFDM) processing devices 70, 72, 74, 76 (even though OFDM processing devices are included here as an example, other type of multicarrier or single carrier processing devices may be used). The OFDM processing devices 70, 72, 74, 76 may be configured to facilitate transmission of the received one of the first, second, third and fourth signal parts 54, 56, 58, 60 over a plurality of subcarriers. The OFDM processing devices 70, 72, 74, 76 may be configured to facilitate transmitting each signal part 54, 56, 58, 60 using an independent one of multiple narrowband subcarriers. The constellation symbol resulting from the modulation mapping devices 62, 64, 66, 68 may be used to define a plurality of values to which the particular subcarriers may be mapped. The use of multiple narrowband subcarriers may be beneficial in certain radio frequency environments compared to a single wideband carrier implementation. In principle, wideband carriers can also be used to carry frequency or spatially diverse information, however, the example of multiple narrowband subcarriers is used based on the likely environmental characteristics allowing it to provide better performance. The OFDM processing devices 70, 72, 74, 76 may be configured to translate a theoretical mapping provided by the modulation mapping devices 62, 64, 66, 68 for each signal part 54, 56, 58, 60 into actual signaling streams (spectrum) having specific parameters that will govern how the corresponding signals are actually transmitted beyond the signal processor 12. In this manner, the OFDM processing devices 70, 72, 74, 76 may be configured to map binary representations associated with the modulation mapping devices 62, 64, 66, 68 to the actual spectrum (e.g., signals received by the converter devices 80, 82, 84, 86).

The signal processor 12 may include a plurality of converter devices 80, 82, 84, 86. The converter devices 80, 82, 84, 86 may be configured to convert signaling associated with a received one of the first, second, third and fourth signal parts 54, 56, 58, 60 from a received frequency to a desired output frequency. The converter devices 80, 82, 84, 86 are shown to convert each of the first, second, third and fourth signal parts 54, 56, 58, 60 to a different frequency, which are correspondingly illustrated as a first frequency (F1), a second frequency (F2), a third frequency (F3) and a fourth frequency (F4). The conversion of each signal part 54, 56, 58, 60 output from the codeword multiplexing device 52 into a different frequency may be useful in providing frequency diversity. The frequency diversity enable the simultaneous transmission of multiple frequency multiplexed signals over medium 34, and thereby may allow more data to be transmitted than multiple spatially multiplexed signals over medium 110. Almost ideal or true orthogonality or diversity may be achieved over the HFC environment while spatial diversity over the wireless medium is not as efficient.

Figure 3:
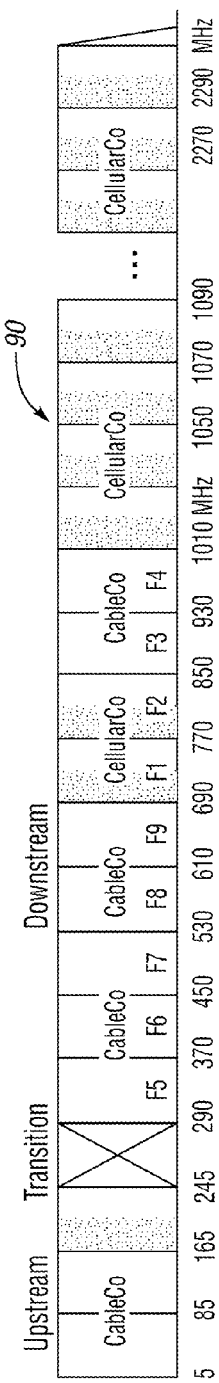
FIG. 3 illustrates a frequency selection map in accordance with one non-limiting aspect of the present invention.

FIG. 3 illustrates a frequency selection map 90 in accordance with one non-limiting aspect of the present invention. The frequency conversion map 90 may be used to facilitate selection of the frequency conversion performed with the signal processor converters 80, 82, 84, 86. The frequency selection map 90 may include a plurality of frequency intervals assigned to facilitate upstream and downstream transmissions within the communication medium 34. An additional interval of frequencies may be set aside as a transition boundary between upstream and downstream related frequencies in order to prevent fall off or other interferences between the upstream/downstream frequencies. The mapping table is shown to include a feed reference (F1, F2, F3, F4, F5, F6, F7, F8, and F9) within each one of the downstream intervals in order to illustrate certain frequency ranges set aside for particular feeds 14, 16, 18. One non-limiting configuration of the communication system 10 contemplates nine feeds being simultaneously transported downstream through the communication mediums without interfering with each other.

Each of the potentially supportable feeds 14, 16, 18 may be assigned to a particular one of the intervals depending on a mapping strategy, licensing strategy or other operational requirements. The frequencies of each feed 14, 16, 18 may be determined by an originator of the corresponding input signal 44. The signal processor 12 may identify the originator from additional information received with the corresponding input signal 44 in order to facilitate identifying which portion of the mapping table 90 has been allocated to support signal transmissions of that originator. A first interval of the downstream frequency spectrum ranging from 690-770 MHz has been allocated to support signaling associated with the originator of the first feed 14. A second interval the downstream frequency spectrum ranging from 77-850 MHz has been allocated support signaling associated with the originator of the second feed 16. The corresponding intervals of the downstream frequency spectrum allocated to the other feeds 18 as shown with reference to one of the illustrated F3, F4, F5, F6, F7, F8 and F9 designations.

When processing the first feed 14, the converter devices 80, 82, 84, 86 assigned to facilitate conversion of each corresponding signal part 54, 56, 58, 60 may be configured to select four different output frequencies from within the corresponding interval of the selection map, i.e., within 690-770 MHz. The particular frequency selected for each converter 80, 82, 84, 86 from within the 690-770 MHz interval may be determined in order to maximize a center frequency spacing, e.g., the first frequency (F1) may correspond with 710 MHz, the second frequency (F2) may correspond with 730 MHz, the third frequency (F3) may correspond with 750 MHz and the fourth frequency (F4) may correspond with 770 MHz. The intervals in the selection map 90 may be tailored to the particular center frequency offset in order to facilitate desired frequency spacing, which for exemplary non-limiting purposes has been selected to correspond with 20 MHz. The signal processor 12 may include a separate set of devices to support simultaneous transmission of the second feed 16 whereby the corresponding converters may be configured to output the signal parts associated with the second feed at 790 MHz, 810 MHz, 830 MHz and 850 MHz. (The devices used to support the additional feeds are not shown however they would duplicate the devices illustrated in FIG. 2 with additional duplicates optionally being included to support additional feeds.)

The signal processor 12 may include a combiner 92 configured to receive the signal parts 54, 56, 58, 60 from the converter devices 80, 82, 84, 86 as well as other signal processors as described here or from other processors from other services carried over the CATV networks. The combiner 92 may be configured to aggregate the received frequency diverse signals for transport over the communication medium 34. The combiner 92 may be configured to prepare the received first, second, third and fourth signal parts 54, 56, 58, 60 for transmission to a laser transmitter (see optical transmitter/receiver (opt. Tx/Rx) in FIG. 1) to facilitate subsequent modulation over an optical medium and/or for transmission directly to a hybrid fiber coaxial (HFC) or other wired communication medium 34. The laser transmitter may be configured to receive the signaling (h11, h22, h33, h44) from the combiner 92 as a single/common input to be subsequently modulated for transport over one or more of the fibers and/or coax portions of the communication medium 34. The communication medium 34 may be used to facilitate long-haul transport of the signal parts 54, 56, 58, 60 for subsequent receipt at the first end station 22. This type of long-haul transport of frequency diverse signaling, derive from processing the non-frequency diverse signaling received at the input 44 to the signal processor, may be helpful in maximizing signaling throughput.

The second signal processor 48 may include a processor, a plurality of down-converter devices, a plurality of OFDM processing devices or alternative multicarrier or single carrier processing devices, a plurality of modulation de-mapping devices and a codeword de-multiplexing device. These devices may be configured to facilitate inverse operations to those described above with respect to the signal processor 12 in order to facilitate generating the output signal 46. While the signal processors 12, 48 are described with respect to including various devices to facilitate the contemplated signal transmission, the signal processors 12, 48 may include other electronics, hardware, features, processors, or any other sufficient type of infrastructure having capabilities sufficient to achieve the contemplated signal manipulation. The first end station 22, in particular, may include an output port or other interface to facilitate communication of the output signal 46 to the first UE 38. In this manner, the communication system 10 may be configured to facilitate wireline signaling between the signal processor 12 and the first end station 22. FIG. 2 describes signaling corresponding with a downstream direction for exemplary purposes as an equivalent but inverse set of components going in the uplink direction may be included to facilitate similar processes in a reverse or inverse order to facilitate upstream signaling.

Figure 4A:
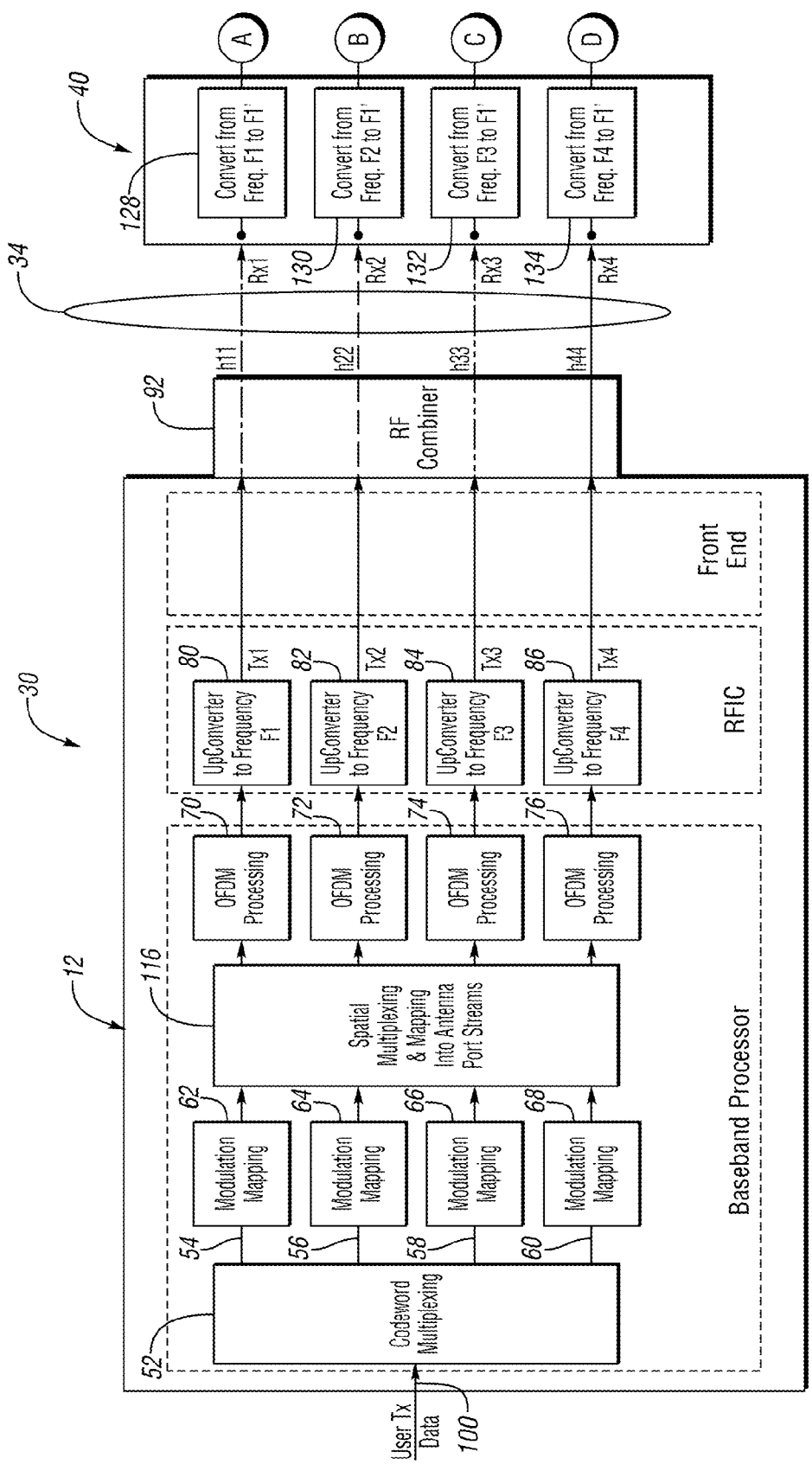
FIGS. 4a-4b schematically illustrate operation of the communication system when facilitating a wireless signaling mode in accordance with one non-limiting aspect of the present invention.
Figure 4B:
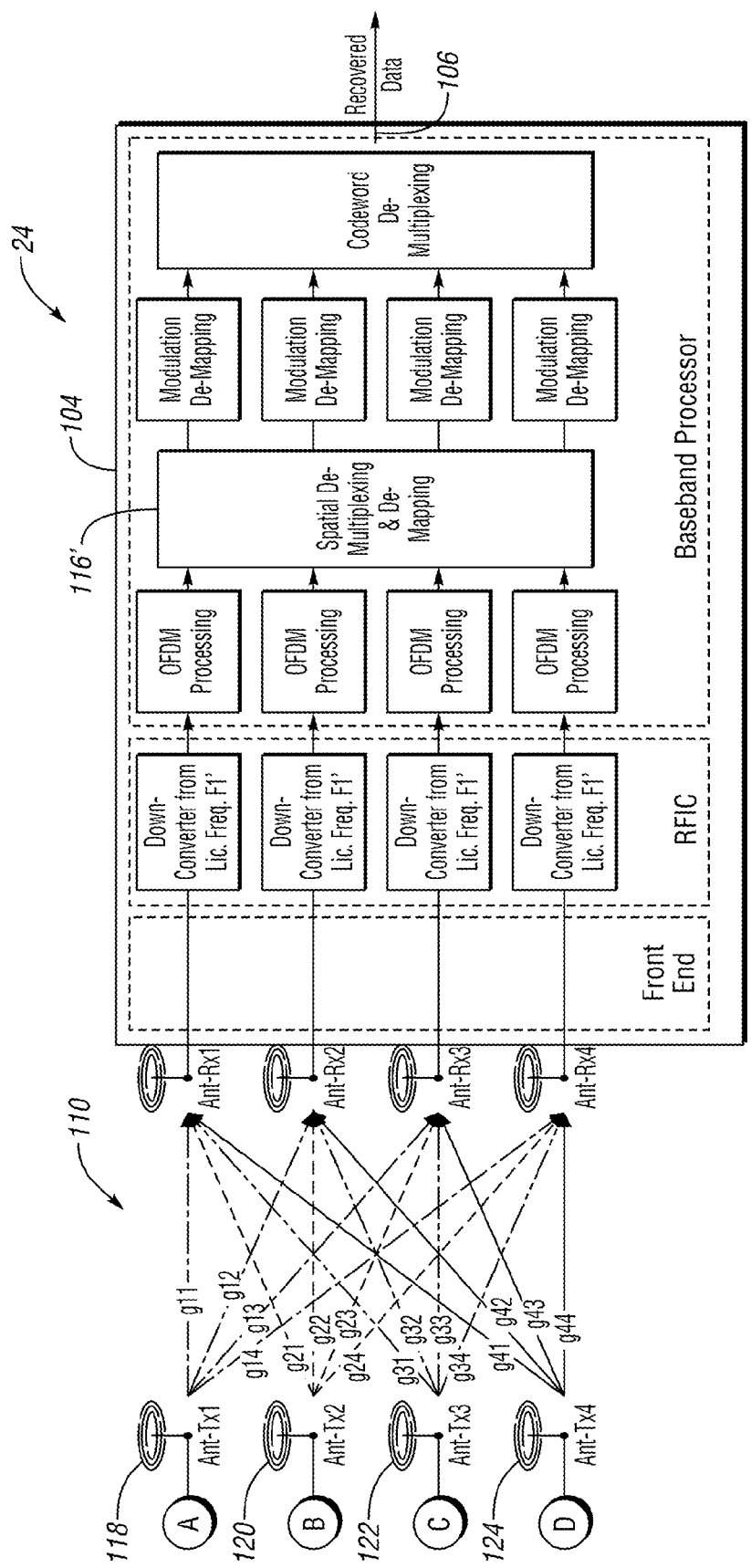

FIGS. 4*a*-4*b* schematically illustrate operation of the communication system 10 when facilitating wireless signal in accordance with one non-limiting aspect of the present invention. The wireless signaling may be similar to the signaling described with respect to FIG. 2 in that an input signal 100 received at the first signal processor 12 is converted to an intermediary signal (combined into a single/common output to laser transmitter, which is shown for exemplary purposes as having four equivalent parts—h11, h22, h33, h44) for transmission to a second signal processor 104 for conversion to an output signal 106. The illustration associated with FIG. 4 differs from that in FIG. 2 at least in that the intermediary signal traverses at least part of the distance between the first and second signal processors 12, 104 through a wireless medium 110. In particular, FIG. 4 illustrates a scenario where the intermediary signal is transmitted initially through the wireline communication medium 34 and thereafter through the wireless communication medium 110, which may correspond with a signal traveling from the headend unit 30 through the third end station 40 for wireless receipt at the second end station 24 (see FIG. 1).

The configuration shown in FIG. 4 may have many uses and applications, including supporting cellular telephone services, or other services that are at least partially dependent on wireless or RF signaling, such as where a provider desires to obtain certain benefits associated with transporting signaling at least partially through the wireline communication medium 34. The ability to at least partially rely on the wireline communication medium 34 may be beneficial in facilitating long-haul transport of the corresponding signaling (intermediary signal) in a manner that maximizes throughput and minimizes interference or other signaling loss that may otherwise occur if transmitted solely through wireless mediums. The third end station 40 may be included between the first and second end stations 22, 24 to facilitate interfacing the wireline communication medium 34 with the wireless communication medium 110. Optionally, the third end station 40 may be positioned as close to the second end station 24 as possible in order to maximize use of the wireline communication medium 34 and/or the third end station 40 may be included as part of the first end station 22 in order to maximize wireless communication.

The first and second signal processors 12, 104 shown in FIG. 4 may be configured similarly to the corresponding signal processors shown in FIG. 2. The elements illustrated in FIG. 4 with the same reference numerals, unless otherwise noted, may be configured to perform in the same manner as those described above with respect to FIG. 2. The first and second signal processors 12, 104 of FIG. 4 may include an additional device to facilitate supporting the at least partial wireless communication, which is referred to as a spatial multiplexing and mapping device 116 and its corresponding inverse 116'. The spatial multiplexing device 116 may be configured to facilitate spatial diversity of the signal parts output from the modulation mapping devices 62, 64, 66, 68. The spatial multiplexing and mapping device 116 may be configured to add delay to one or more of the signal parts 54, 56, 58, 60 or modify these signal parts in different ways in order to facilitate spatially separating each signal part 54, 56, 58, 60 from one another. This may be beneficial in order to enhance the spatial diversity of antennas 118, 120, 122, 124, which may be individually used to transmit the signal parts 54, 56, 58, 60.

The third end station 40 may be configured to receive the frequency diverse signaling output from the combiner 92. The third end station 40 may include converter devices 128, 130, 132, 134 or additional features sufficient to facilitate converting the received frequency diverse signaling to spatially diverse signaling. The third end station 40 may include one converter device 128, 130, 132, 134 for each of the received signal parts, i.e., a first converter 128 for the first signal part 54, a second converter 130 for the second signal part 56, a third converter 132 for the third signal part 58 and a fourth converter 134 for the fourth signal part 60. Each converter 128, 130, 132, 134 may be configured to convert the frequency of the received signal part to a common frequency in order to translate frequency diversity over medium 34 to spatial diversity over medium 110. The common frequency may correspond with a frequency licensed by an originator of the input signal 100, e.g., wireless frequency ranges purchased by cell phone service providers and/or another frequency range otherwise designated to be sufficient to facilitate subsequent wireless transmission to the second end station 24. The second end station 24 may include a separate antenna and separate active converter devices for each of the spatially diverse signal it receives in order to facilitate spatially receiving the signal parts to the second UE. FIG. 4 describes signaling corresponding with a downstream direction for exemplary purposes as an equivalent but inverse set of components going in the uplink direction may be included to facilitate similar processes in a reverse or inverse order to facilitate upstream signaling.

Figure 5A:
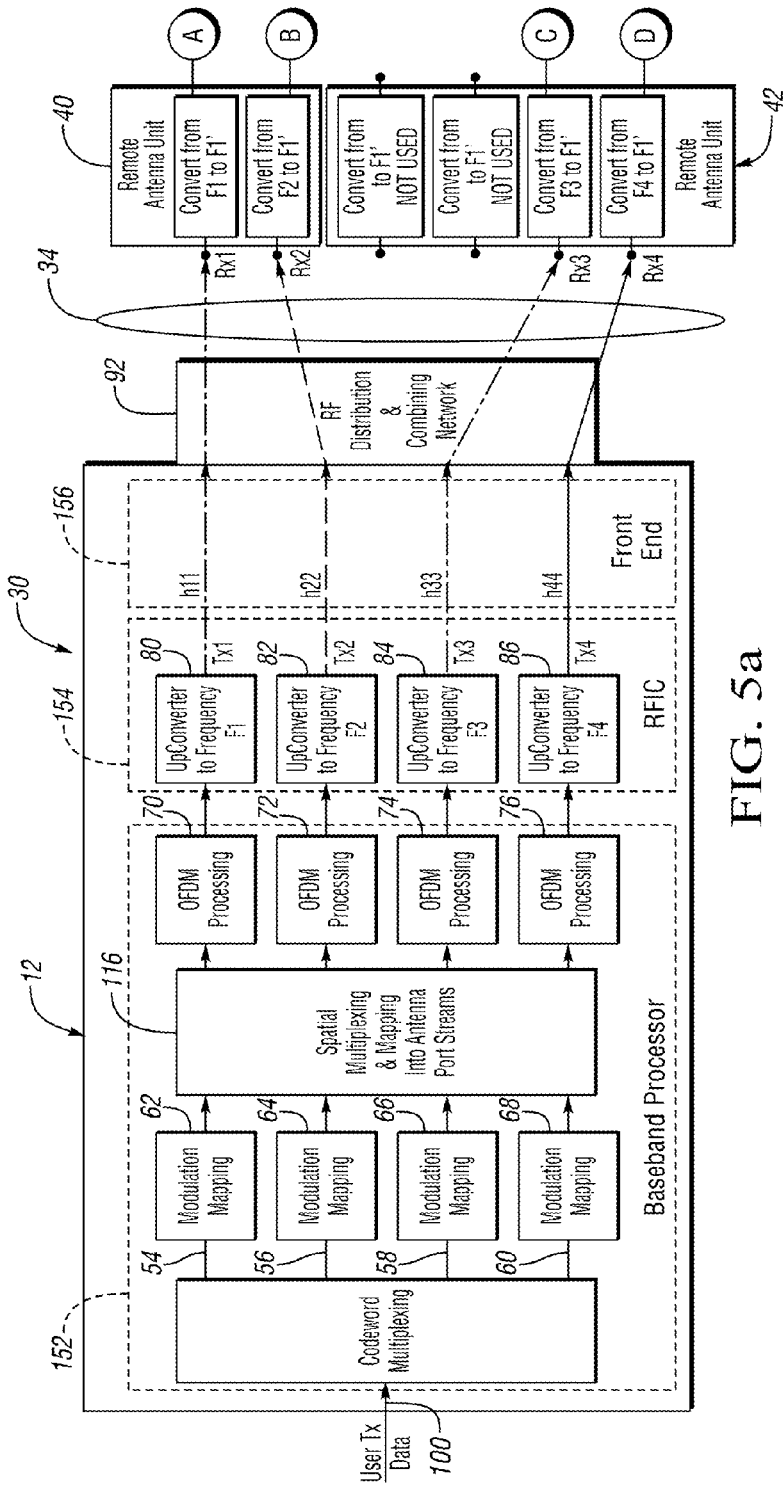
FIG. 5a-5b schematically illustrates operation of the communication system when facilitating wireless signaling having enhanced spatial diversity in accordance with one non-limiting aspect of the present invention.
Figure 5B:
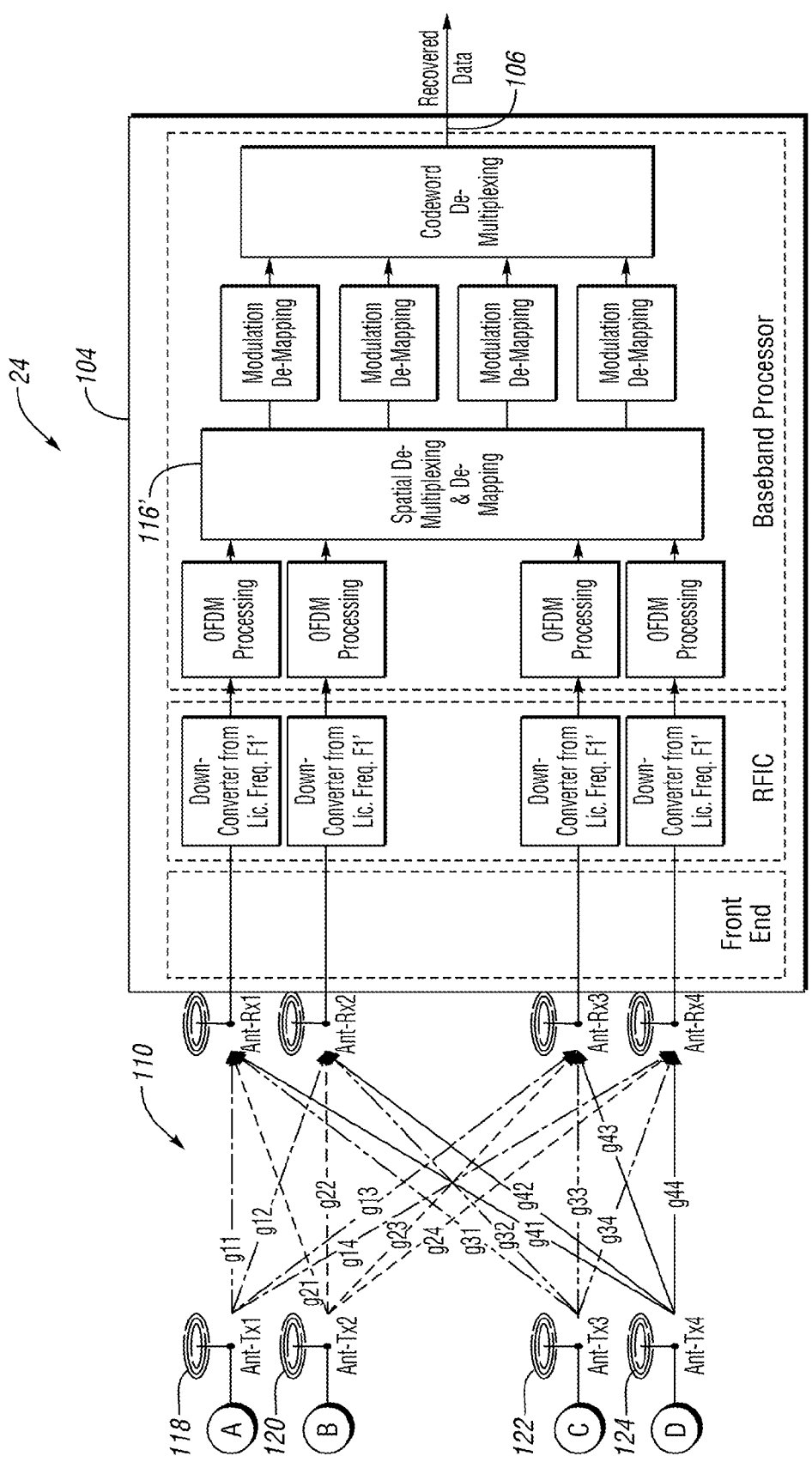

FIGS. 5a-5b schematically illustrates operation of the communication system 10 when facilitating wireless signaling having enhanced spatial diversity in accordance with one non-limiting aspect of the present invention. The wireless signaling may be similar to the signaling described with respect to FIGS. 2 and 4 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 5 differs from that in FIG. 4 at least in that the intermediary signal traverses at least part of the distance between the first and second signal processors 12, 104 through the wireless medium 110 by way of two remote antenna units instead of one the selection and operation of which may be determined in the manner described in U.S. patent application Ser. No. 14/181,645, entitled Multiple-Input-Multiple-Output (MIMO) Communication System, filed Feb. 15, 2014, the disclosure of which is hereby incorporated by reference in its entirety. FIG. 5 illustrates a scenario where the intermediary signal is transmitted initially through the wireline communication medium 34 and thereafter through the wireless communication medium 110, which may correspond with signaling traveling from the headend unit 30 through the third end station 40 and the fourth end station 42 for wireless receipt at the second end station 24 (see FIG. 1). FIG. 5 provides enhanced spatial diversity for the wireless signals due to the third end station 40 being at a location physical different from or spatially distinct from the fourth end station 42.

One non-limiting aspect of the present invention contemplates the third and fourth end stations 40,42 being physically spaced apart in order to enhance the spatial diversity of the wireless signals transmitted therefrom, at least in comparison to the wireless signaling shown in FIG. 4 to be transmitted solely from the third end station 40. The fourth end station 42 is shown to be connected to a different trunk, cable, fiber line, etc. than the third end station 40 in order to demonstrate the ability of the signal processor 12 to transmit signals to the second end station 24 using multiple, frequency diverse portions of the wired communication medium 34. The signal processor 12 may be configured to select from any number of end stations when determining the two or more end stations desired to communicate wireless signaling with the second end station. The two or more end stations may optionally included another end station that may be closer to the second end station and/or connected to the same trunk or feed, such as but not limited to a fifth end station 140 (see FIG. 1). In this manner, the signaling desired for receipt at the second end station may commonly originate from the signal processor and thereafter traverse different portions of the wired communication medium 34 and the wireless communication medium 110 prior to being re-joined and commonly received at the second end station 24. FIG. 5 describes signaling corresponding with a downstream direction for exemplary purposes as an equivalent but inverse set of components going in the uplink direction may be included to facilitate similar processes in a reverse or inverse order to facilitate upstream signaling.

Figure 6A:
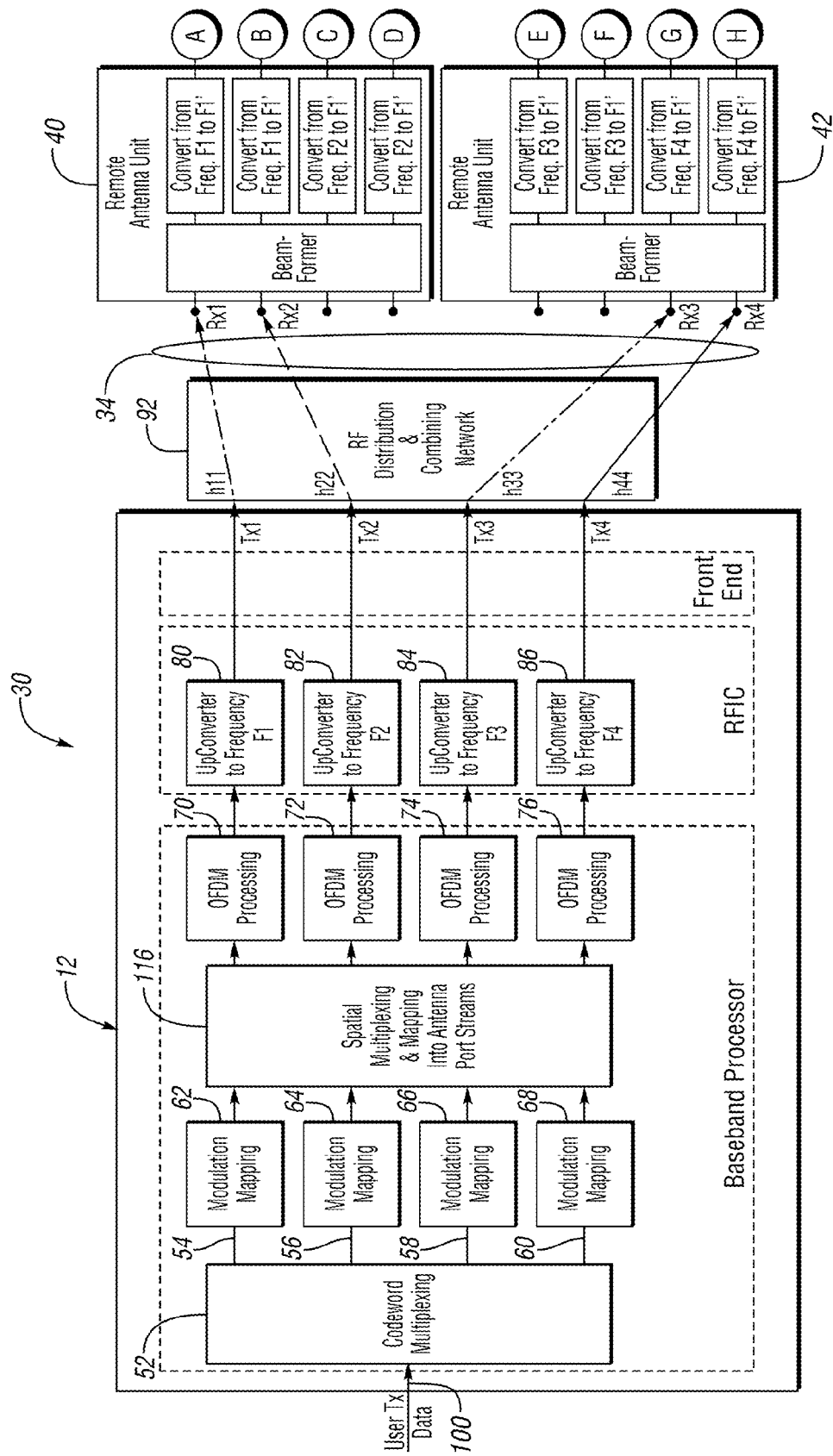
FIG. 6a-6b schematically illustrates operation of the communication system when facilitating wireless signaling having enhanced spatial diversity in accordance with one non-limiting aspect of the present invention.
Figure 6B:
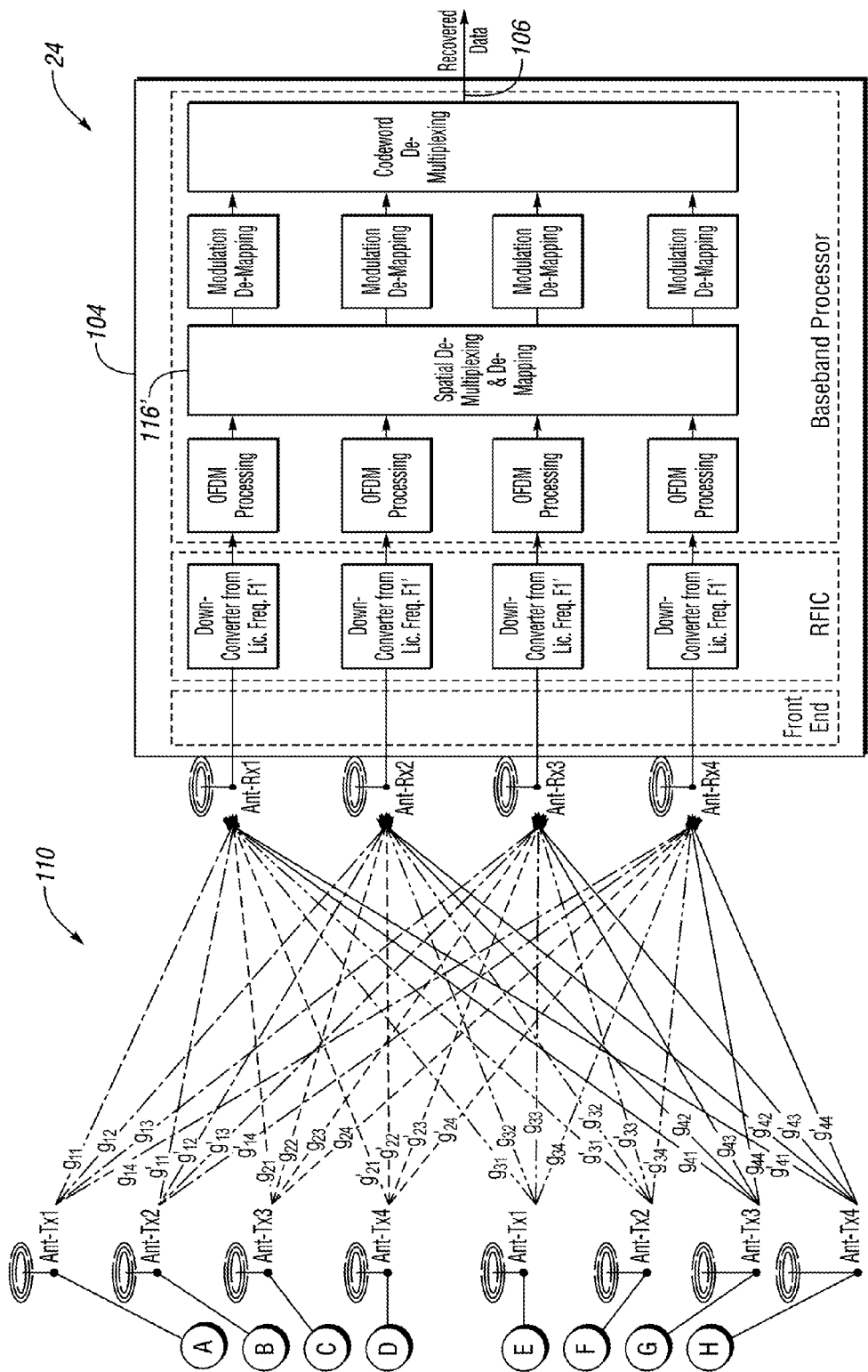

FIGS. 6a-6b schematically illustrates operation of the communication system 10 when facilitating wireless signaling having enhanced spatial diversity with beamforming in accordance with one non-limiting aspect of the present invention. The wireless signaling may be similar to the signaling described with respect to FIGS. 2, 4 and 5 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 6 differs from that in FIG. 5 at least in that the intermediary signal traverses at least part of the distance between the first and second signal processors 12, 104 through the wireless medium 110 using beamforming. FIG. 6 illustrates a scenario where the intermediary signal received at each of the first and second end stations 40, 42 is replicated with beamformers such that duplicate signals are output to addition ports for use in transmitting four wireless signals. The additional wireless signals may be replicated with phase, delay or amplitude adjustments sufficient to facilitate beamforming. FIG. 6 describes signaling corresponding with a downstream direction for exemplary purposes as an equivalent but inverse set of components going in the uplink direction may be included to facilitate similar processes in a reverse or inverse order to facilitate upstream signaling.

Figure 7:
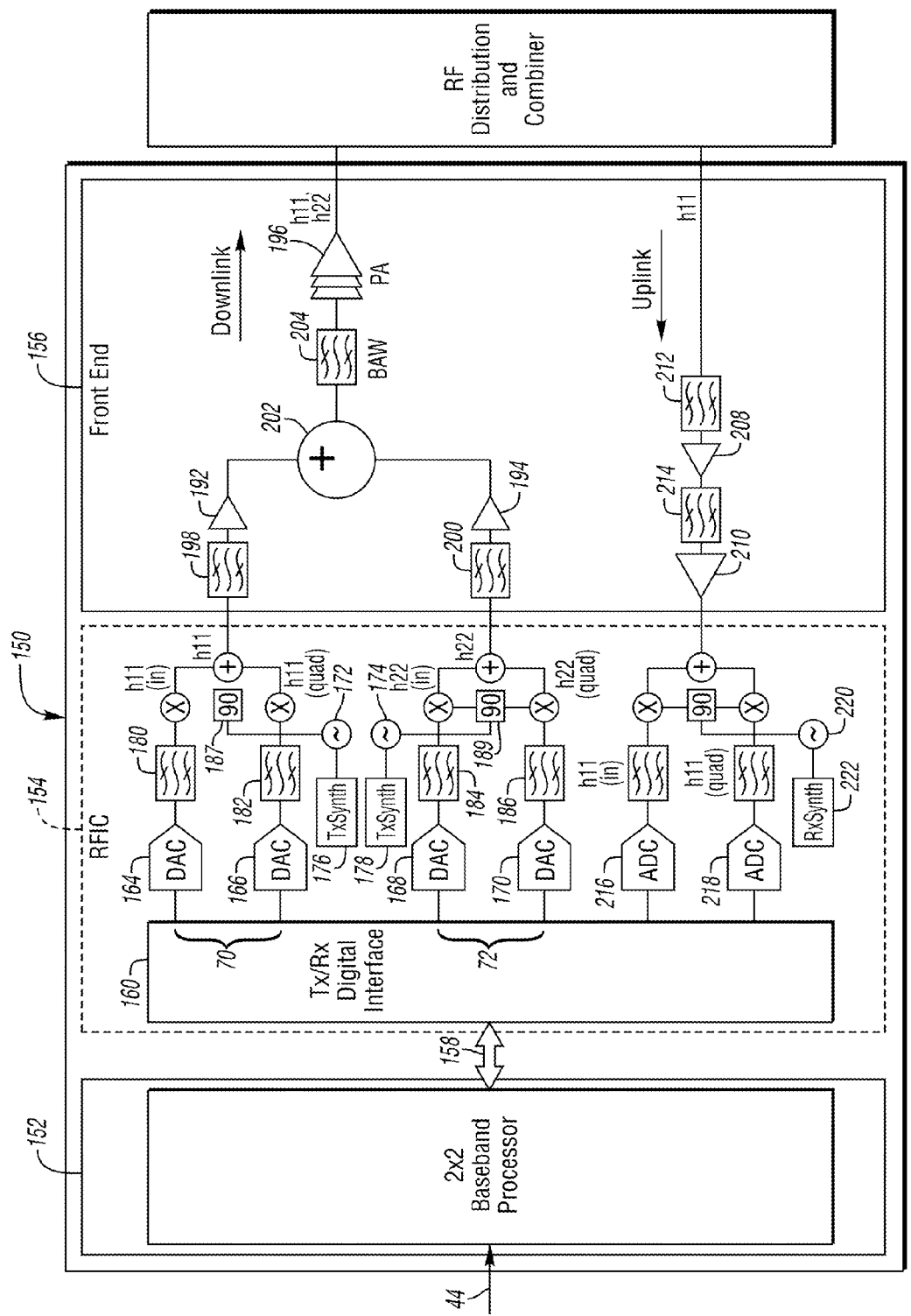
FIG. 7 illustrates a signal processor as configured to facilitate signaling in accordance with one non-limiting aspect of the present invention.

FIG. 7 illustrates a signal processor 150 as configured to facilitate signaling in accordance with one non-limiting aspect of the present invention. The signal processor 150 may be considered as a 2×2 MIMO signal processor at least in that the input signal 44 is shown to be processed into a first signal (h11) and a second signal (h22) for transport. The signal processor 150 may be one of the signal processors 12 residing at the headend or hub location 30 in a wireline cable network as an aggregation/distribution component to facilitate interconnecting an aggregation network to the access or local distribution network (e.g., wireline network 34 and/or wireless network 110). The signal processor 150 may include a plurality of devices configured to facilitate processing signals for wireline transport over the cable network 34, and optionally subsequent wireless transmission over the wireless network 110. (The plurality of devices are illustrated in FIGS. 2, 4 and 5 for exemplary non-limiting purposes with respect to those associated with facilitating downlink communications, i.e., communications originating from headend and thereafter traversing in a downstream direction to the end stations). The devices are shown for exemplary non-limiting purposes with respect to being arranged into three basic components: a baseband processor unit 152, a radio frequency integrated circuit (RFIC) 154 and a front end 156.

The baseband processor 152 unit may include various devices (e.g., the devices 52, 62, 64, 66, 68, 70, 72, 74, 76 and/or 116) associated with processing the input signals received at the signal processor for subsequent transport. The baseband processor unit 152 may process the input signals, which may be baseband, non-CW signals or signals otherwise lacking spatial and/or frequency diversity, into frequency diverse signals (e.g., when configured in accordance with FIG. 2 or in other situations when sufficient spatial diversity may be provided (e.g., in the event two remote antennas are sufficiently spaced) and into frequency and spatially diverse signals (e.g., when configured in accordance with FIGS. 4-6). The baseband processor unit 152 may be configured to generate individual data paths in a digital form prior to conversion into a digitally modulated RF signal for upconversion to the intended frequencies. Rather than having the baseband processor 152 in a different location than the RFIC 154 and the front end 156 as is the case with some remote antenna unit implementations, one non-limiting aspect of the present invention contemplates having them co-located, optionally with a Joint Electron Device Engineering Council (JEDEC) specification (JESD207) interface 158 or an equivalent or otherwise sufficient interface as a connection piece to a transmit/receive (Tx/Rx) digital interface 160. The JESD207 interface 158 may eliminate the need for connecting the baseband processor using a fiber optic link for carrying the digitized RF therebetween.

Optionally, the baseband processor 152 may utilize the capability for higher order modulation as well as capabilities for carrying information within a long term evolution (LTE) payload or other wireless payload containing the HFC frequency assignment, end device and antenna element location information (used while in the HFC domain 34). This information may be used to further enhance the capabilities of the system to facilitate transmitting signaling over wireline and wireless segments. In addition, reliance on the LTE protocol may enable use of a number of control channels, such as a Packet Data Control Channel (PDCCH) to facilitate at least downlink signaling, system setup and link maintenance. The output channels h11, h22 may be specified as low order modulation only (QPSK or BPSK) to ensure robustness in the wireless environment. However, in the cable environment, control channel overhead could be reduced by using only one symbol of PDCCH instead of the three symbols used in wireless applications and efficiency could be greatly increased by increasing the modulation order of these channels and leveraging the more benign channel characteristics of the HFC plant. Additionally, the present invention proposes updates to modify the length of the cyclic prefix (CP) currently specified in the LTE protocol. CP inserted before each OFDM symbol can be reduced in the cable environment to improve efficiency, at least in comparison to LTE, which specifies a number of CP lengths to take into account of varying degrees of expected inter-symbol interference.

At least in the downlink direction, the RFIC 154 may be the component that uses the digital data paths signals and directs them through an appropriate digital-to-analog converter (DAC) 164, 166, 168, 170 to be subsequently upconvert to desired frequencies. The RFIC may be configured in accordance with the present invention to employ independent local oscillators (LO) 172, 174 and transmit synthesizers 176, 178 for each path (h11, h22). The use of separate oscillators may be beneficial in allowing for multiple independently placed data paths at different frequencies to enhance frequency orthogonality, e.g., the data path output from the OFDM 70 may be converted to a frequency (F1) that is different from a frequency (F2) of the data path output from the OFDM 72. (An oscillator common to both paths (h11, h22), at least when connected in the illustrated manner, would be unable to generated the separate frequencies F1, F2.) Filters 180, 182, 184, 186 may be included for an in-phase portion (h11(in), h22(in)) and a quadrature portion (h11(quad), h22(quad)) to filter signals before subsequent front end processing, such as to facilitate removing noise, interferences or other signal components before the in-band and quadrature portions reach RF mixers operating in cooperation with the oscillators 172, 174. Optionally, the filters 180, 182, 184, 186 may be tunable, e.g., according to the frequency of the signaling from the OFDM 70, 72 as the OFDM frequency may vary. Instead of frequency multiplexing the signals adjacent to each other, and thereby requiring sharp roll-off filtering, the separate oscillators 172, 174 may be used to maintain frequency orthogonality, i.e., signal spacing, optionally allowing for placement of the orthogonal signal carriers without guard-bands and/or the use of a filter(s). The RFIC may be configured with 90 degree phase shifters 187, 189 to generate signals that are in-phase and in-quadrature to maximize total capacity. The phase shifter 187, 189 receive the local oscillator signal as input and generate two local oscillator signal outputs that are 90 degrees out of phase. These components enable the generation of quadrature amplitude modulated (QAM) signals. This invention describes the transmission of QAM signals as an example but it is not limited to QAM based transmissions.

The front end device 156 may be configured to aggregate and drive the signals h11, h22 to the coaxial medium (RF distribution and combining network) in the downlink direction. With the front end 156 connecting to the wired communication medium 34, the preset invention contemplates delivering signals from the signal processor 150 at relatively lower power levels than the signals would otherwise need to be delivered if being transmitted wirelessly. In particular, the contemplated cable implementation may employ amplifiers 188 (see FIG. 1) within the fiber and/or trunks to maintain the signaling power within certain levels, i.e., to amplify signaling output (h11, h22) from the RF distribution and combining network at relatively lower power levels and/or to ensure the signal power as emitted from the RF combining network remains approximately constant. The power level, for example, of a 20 MHz signal (h11, h22) output from the RF distribution and combining network to the optical transmitter may be approximately −25 dBm whereas similar wireless signaling outputted to an antenna, such as from a macro cell, may need to be greater, e.g., approximately 40 dBm. This contemplated capability of the present invention to leverage existing amplifiers and capabilities of existing HFC plants 34 may be employed to minimize the output signaling power requirements, and thereby improve design implications (i.e. lower gain) and provide lower implementation costs.

Downlink amplifiers 192, 194, 196 and/or filters 198, 200, 202 may be controllable to facilitate outputting the corresponding signaling at different power levels, e.g., the amplification of a first amplifier 192 may be different from a second amplifier 194 and/or an output amplifier 196. The amplification of the first and second amplifiers 192, 194, for example, may be set according to a signaling frequency and path being traversed to a corresponding output end station or remote antenna unit, i.e., the amplification of the signaling to the third end station 40 may be greater than or less than the amplification of the signaling to the fourth end station 42. In the medium 34, the channel frequency used to carry signals to end station 40 may be more attenuated than the channel frequency carrying the signals to end station 42, which may be compensated for with corresponding control of the amplifiers 192, 194. The ability to control the amplification on a per path basis may be beneficial in setting a slope of the corresponding signaling to account for losses, attenuation and/or other signaling characteristics of the corresponding path within the wired communication medium 34 in order to insure the signals are approximately flat when received at the corresponding output (e.g., the third and fourth end stations 40, 42). The output amplifier 196 may be similarly adjustable to further facilitate refinement of signaling power levels, such as to commonly amplify the signaling output (h11, h22) to the RF combiner using a larger and/or less precise amplifier than the first and second amplifiers 192, 194, which may be beneficial in allowing the use of smaller/more precise/accurate individual adjustment of first and second amplifiers 192, 194 and/or a more cost effective configuration.

The first and second amplifiers 192, 194 may optionally operate in cooperation with corresponding first and second filters 198, 200. The first and second filters 198, 200 may be controllable in order to facilitate downstream synchronization, elimination of sidelobes, unwanted adjacent channel energy and/or to compensate for signal distortions and/or other characteristics of the particular data paths to be traversed by the corresponding signaling. A combiner or other summation device 202 may be configured to join the signals (h11, h22) output from the first and second amplifier 192, 194, optionally after being individually gain adjusted and/or filtered. A bandpass filter such as a bulk acoustic wave (BAW) filter 204 may be used to minimize/suppress the energy of the OFDM sidelobes (70, 72) that may be generated outside the occupied signal spectrum, such as by passing through signaling within a passband range and blocking signaling outside thereof. The BAW 204, like the output amplifier 196, may be an extra component positioned downstream of the first/second amplifiers and filters 192, 194, 198, 200 in order to commonly filter the output signaling, such as for the purposes of using a larger and/or less precise filter 204 than the first and second filter 198, 200, which may be beneficial in allowing the use of smaller/more precise/accurate first and second filters 198, 200 and/or a more cost effective configuration. The BAW filter 204 or an equivalent filter may be used to protect services that coexist within medium 34, which occupy adjacent spectrum to the system described here.

In the uplink direction, signal processor 150 may be configured to processing incoming signals from an end stations ES, which is shown for exemplary purposes a signal h11, which may be different than the h11 signal transmitted on the downlink. The signal processor 150 is shown to support 2×2 MIMO on the downlink and 1×1, or non-MIMO, on the uplink for exemplary, non-limiting purposes as similar MIMO capabilities may be provided on the uplink. The incoming signal (h11) may be processed with third and fourth amplifiers 208, 210 and third and fourth filters 212, 214. The third and fourth amplifiers/filters 208, 210, 212, 214 may be controllable and/or tunable in order to facilitate proper signal recovery. As multiple tunings may occur over time for the downstream signaling, the upstream tunings may be similarly dynamic. State information may be kept to track and control the specific tuning parameters and/or data or other information may be include in the received signaling to facilitate the desired tuning of the third and further amplifiers/filters. Analog to digital converters (ADC) 216, 218 may be used to digitize the upstream down converted RF signals such that the front end device 156 may be configured to aggregate and drive the signal h11 from the coaxial medium in the uplink direction. As opposed to the separate oscillators and synthesizers in the downlink, the uplink maybe configured to operate in a SISO (or 1×1 MIMO) configuration may include a single oscillator and synthesizer 220, 222 to facilitate commonly converting the incoming signaling (h11) to the frequency output from the baseband processor (i.e., frequency of 70, 72) and/or another desired frequency. In case of an uplink configuration of 2×2 MIMO or greater MIMO order in medium 34 which requires frequency diversity, multiple local oscillators may be used.

Figure 8:
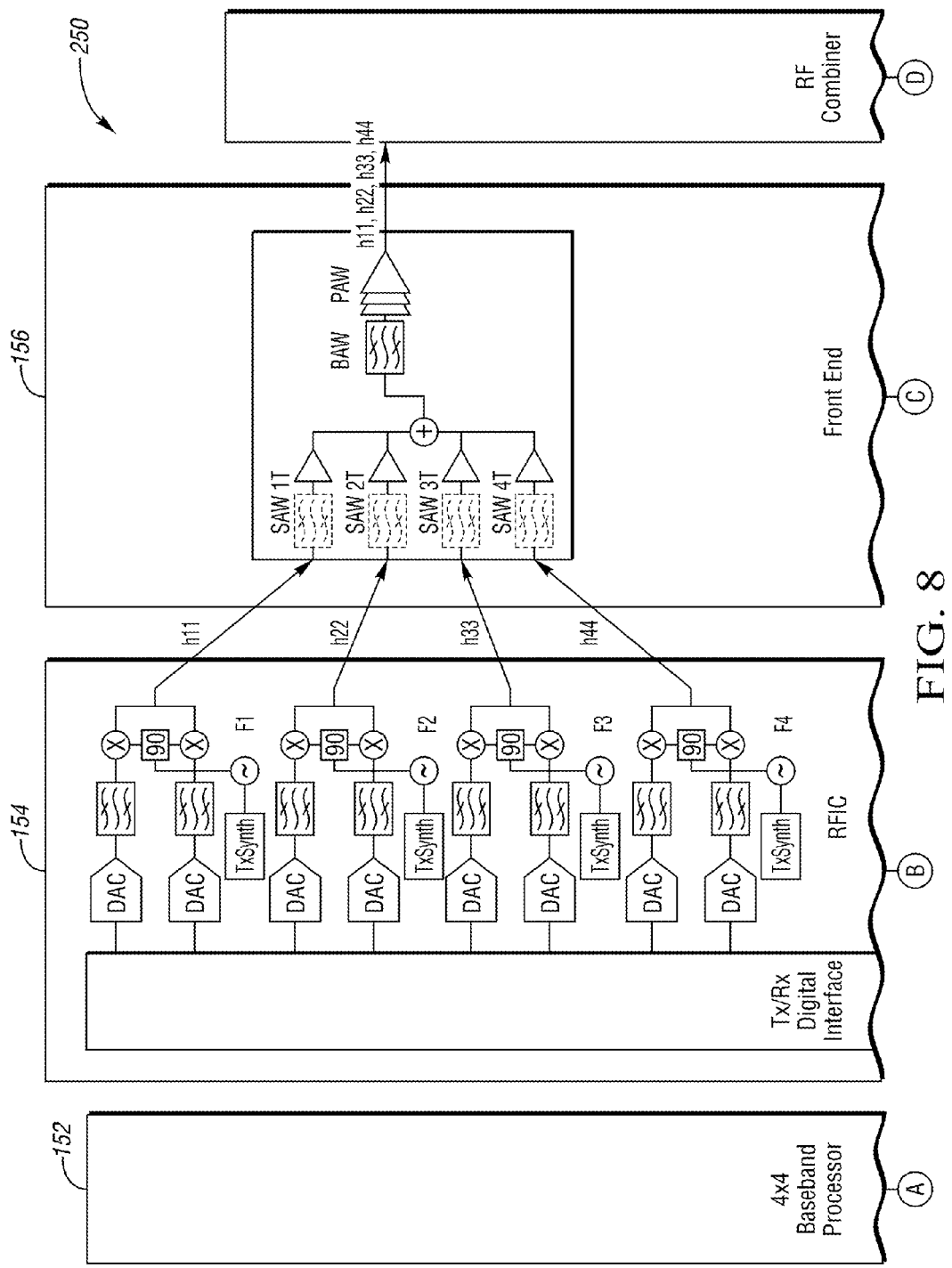
FIG. 8 illustrates a signal processor as configured to facilitate signaling in accordance with one non-limiting aspect of the present invention.
Figure 8:
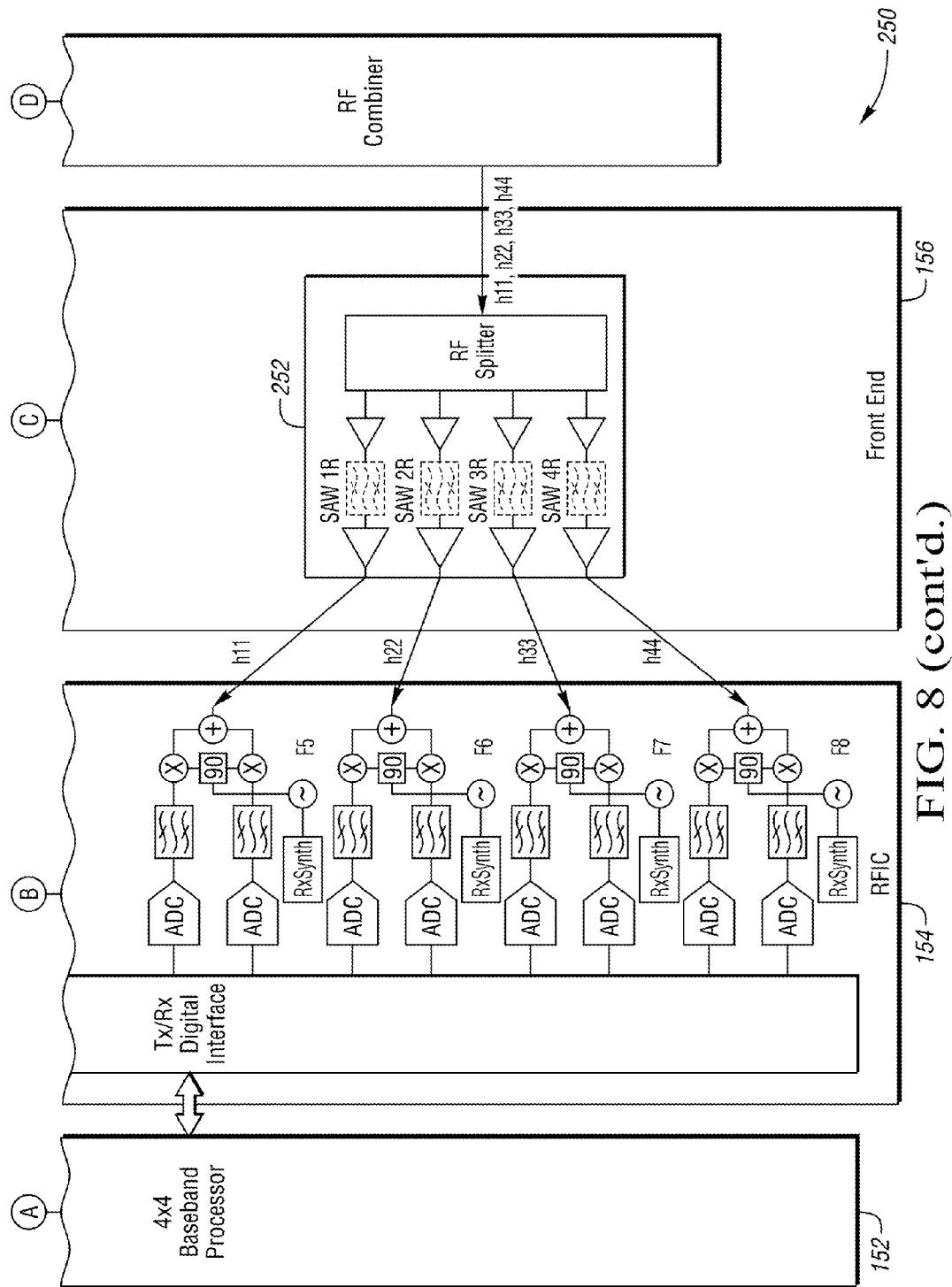

FIG. 8 illustrates a signal processor 250 as configured to facilitate signaling in accordance with one non-limiting aspect of the present invention. The signal processor 250 may be considered as a 4×4, MIMO signal processor at least in that singular signals input to and output from the baseband processor may be processed into a first signal (h11), a second signal (h22), a third signal (h33) and a fourth signal (h44) during uplink and downlink transport through the signal processor 250. The signal processor 250 may be configured similarly to the signaling processor 150 shown in FIG. 8, particularly with respect to the use of amplifiers, filters, combiners, digital and analog converters and oscillators/synthesizers (reference numerals have been omitted however the operation of the components may be controlled in the manner described above and the associated operation may be understood according to the corresponding circuit designation known to those skilled in the art). The signal processor 250 may include multiple oscillators/synthesizers, designated as F1, F2, F3, F4, F5, F6, F7 and F8, each of which be operable at a different and/or controllable frequency, to facilitate the contemplated MIMO operations. An RF splitter 252 may be added in the uplink to facilitate separating incoming (upstream) signaling into the equivalent parts h11, h22, h33, h44. (Note that unlike FIG. 6 that shows a SISO configuration in uplink, this example shows a 4×4 MIMO in the uplink.)

Figure 9:
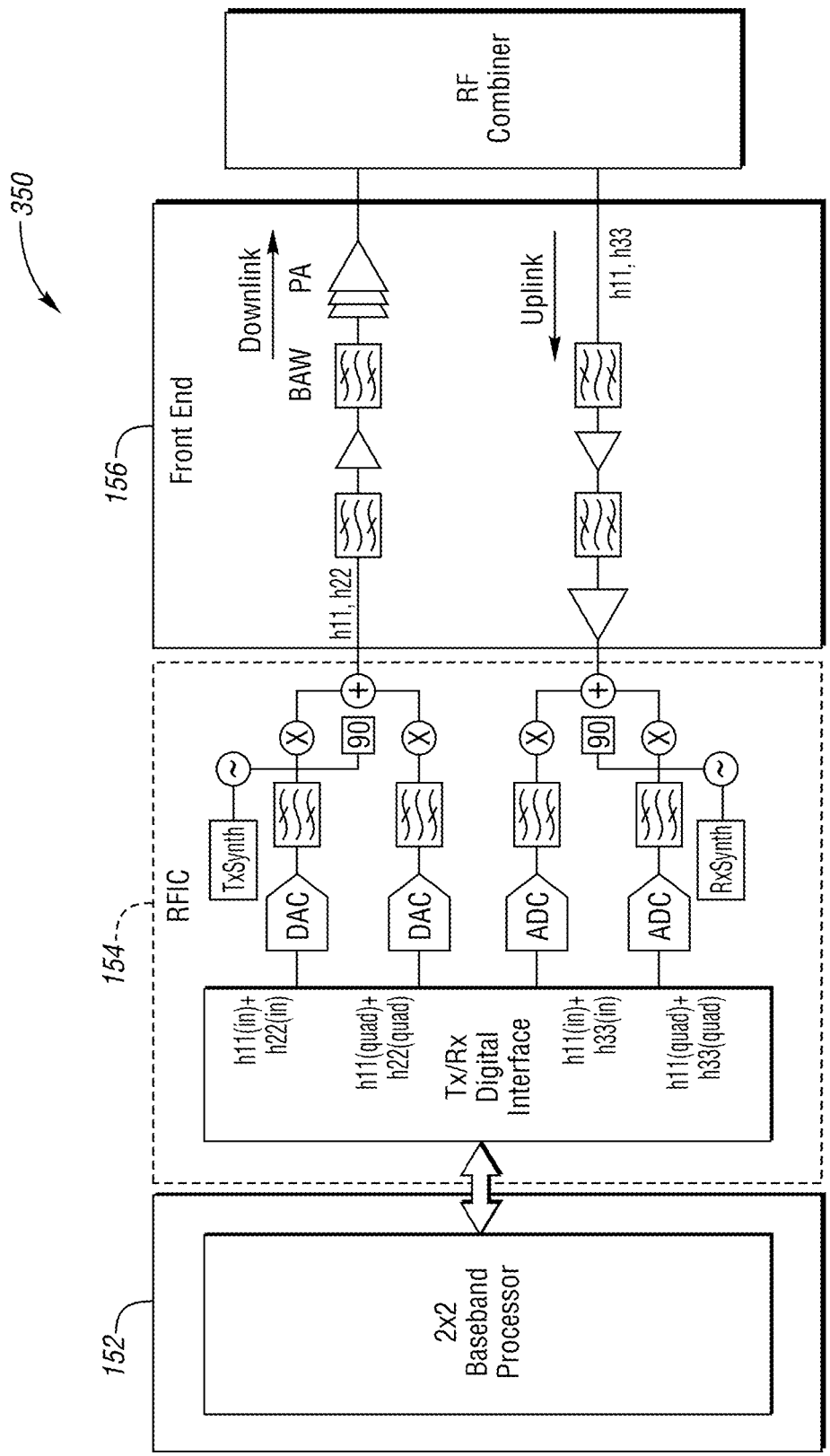
FIG. 9 illustrates a signal processor as configured to facilitate signaling in accordance with one non-limiting aspect of the present invention.

FIG. 9 illustrates a signal processor 260 as configured to facilitate signaling in accordance with one non-limiting aspect of the present invention. The signal processor 260 may include the baseband processor unit common to the signal processors shown above (12, 150, 250) while being configured to leverage the same chip as the wireless unit but with the RFIC and the front end chips being customized for the HFC environment. In FIG. 9, wideband generation of the aggregate spectrum of all LTE MIMO data paths and aggregated carriers takes place in a single step (e.g., combining multiple signal components (h11(in)+h22(in) in the downlink and simultaneously receiving other signals in the uplink such as (h11(in)+h22(in)). This may require a much higher sampling rate DAC in order to generate a much wider spectrum that would include a larger number of channels associated to the MIMO data paths and aggregated LTE carriers. For example an LTE system that uses 4×4 MIMO in the downlink and aggregates of two 20 MHz carriers, occupies a total of 4×2× 20 MHz=160 MHz assuming the 20 MHz channels are placed continuously without gaps. This spectrum can be made wider assuming that higher rank MIMO and higher carrier aggregation are implemented. In addition to the higher sampling rates DACs it is also required that at the Tx/Rx digital interface the data paths are intelligently aggregated.

This type of aggregation lends itself for further optimization making sure that all downlink transmissions are synchronized and orthogonal to each other. The orthogonality requirement enables the elimination of guardbands as described in the continuous OFDM system of U.S. patent application Ser. No. 13/841,313, the disclosure of which is hereby incorporated by reference in its entirety. A 10% improvement in efficiency can be achieved, the 160 MHz occupied signal bandwidth reduces to 144 MHz (4×2×18 MHz). What is shown in FIG. 8 is a baseband of 160 MHz (or 144 MHz when guardband elimination is applied) aggregation of channels that are upconverted to an RF frequency. An even higher sampling rate can generate full spectrum and avoid the upconversion process. These different implementation options provide flexibility based on the cost of customization of the overall system.

As shown in FIG. 5, the signal processor 12, optionally having the various RFIC and front end configurations associated with the more detailed signal processors 150, 250, 260 (baseband portions are contemplated to be essentially the same for each implementation except for the number of signal paths and related components varying depending on whether the configuration is 1×1, 2×2, 2×1, 4×4, 8×8 etc.), may be configured to facilitate MIMO related signaling by processing an input signal into multiple, frequency diverse signals (e.g., h11, h22, h33, h44) particularly suitable for transmission over an HFC infrastructure. Following transmission over the HFC infrastructure, the signals may optionally be processed for further wireless transport, such as by converting the frequency diverse, MIMO related signals to a common frequency prior to facilitating wireless transmission. Spatial diversity may be facilitated by adding delay and/or other adjustments to the frequency diverse signals, i.e., signals carried over the HFC infrastructure, and/or by directing different portions of the MIMO signals derived from the same input signal to different, spatially diverse remote antennas before wireless transport. Optionally, the frequency diverse, MIMO signals may be transmitted to different types of remote antennas units or remote antennas units having different transmission capabilities, e.g., FIG. 5 illustrates the third and station 40 having two converters and the fourth end station 42 having four converters.

The remote antenna units 40, 42, or more particularly the converters associated therewith, may be configured to convert received signaling for transport over corresponding antennas. Each antenna may be configured to transmit one of the converted, MIMO signals (h11, h22, h33, h44), effectively resulting in transmission of multiple signals, e.g., signal h11 effectively produces multiple signals g11, g12, g13, g14 due to signal h11 being received at multiple antennas included on the receiving user equipment 24. The remote antenna units 40, 42 may be configured to simultaneously emit multiple signals, such as MIMO signals associated with different feeds and/or MIMO signals intended for receipt at other usual equipment besides the illustrated user equipment 24. The remote antenna units 40, 42 may include capability sufficient to facilitate beamforming or otherwise shaping wireless signals emitted therefrom, such as to in a manner that prevents the beams from overlapping with each other or unduly interfering with other transmitted signaling. The beamforming may be implemented using multiple antenna arrays or antennas associated with each of the illustrated antennas, such as according to the processes and teachings associated with U.S. patent application Ser. No. 13/922,595, the disclosure of which is hereby incorporated by reference in its entirety.

FIG. 10 illustrates a flowchart 400 of a method for controlling a signal processor to facilitate wireless signaling in accordance with one non-limiting aspect of the present invention. The method may be embodied in a non-transitory computer-readable medium, computer program product or other construct having computer-readable instructions, code, software, logic and the like. The instructions may be operable with a processor or other logically executing device of the signal processor and/or another one or more of the devices/components described herein to facilitate controlling the signaling processor and/or the other devices/components in the manner contemplated by the present invention to facilitate delivering wireless signaling. The method is predominately described for exemplary non-limiting purpose with respect to at least a portion of the wireless signaling, or corresponding intermediary signaling, being long-hauled carried over a wired and/or wireline communication medium, such as but not necessarily limited to cable or hybrid-fiber coax (hfc) network. The long-haul or intermediary signaling may be facilitated with processing or other controls performed with the signal processor sufficient to provide wired transport over a greater distance than the eventual wireless signaling transport, thereby leverage off of the economies associated with wired transport while also facilitating final interaction with wireless devices.

Block 402 relates to a master controller or other suitable entity collecting or otherwise determining resources available to a signal processor to facilitate transporting signals over wired mediums/networks to particular service areas. The master controller may also send control messages after sniffing in-band messages (in the signal) that contain desired frequency information. The resources may be considered in terms of data or RF spectrum representative of data rates, frequencies and other parameters related to transporting wired signaling from the signal processor, which may vary depending on the particular operating constraints and/or other variables associated with each portion of the wired medium. The service area may correspond with geographical areas traversed with the fiber nodes or other wired trunks within the domain of the signal processor, e.g., the area associated with each tap or reachable through a wire interconnecting the tap with one of the end stations. The geographical areas may be identified with global positioning system (GPS) markers/vectors, latitude and longitude and/or other references sufficient to represent the wired areas reachable from the signal processor. In the event multiple wired paths are available between the signal processor and an end station, a user equipment or other termination point, those overlapping or multipath determinations may be identified along with the spectrum or other signaling parameters associated therewith.

Block 404 relates to collecting or otherwise determining resources available to the signal processor to facilitate transporting signals over the wireless mediums/networks of particular service areas. The service areas may correspond with geographical areas reachable from each end station, e.g., the wired and/or wireless reach of each end station to facilitate continued signal transport. The end stations having an antenna or other capabilities sufficient to facilitate continued wireless signaling, i.e., signaling beyond the physical location associated with a tap or device physically connected by a wire thereto, may be referred to as remote antenna units. The spectrum available to the remote antenna units may be identified in a similar manner to the wired spectrum, at least in so far as identifying beamforming capabilities, data rates, frequencies, protocols and/or other operational constraints and a corresponding geographical position of the wireless interfaces and their corresponding coverage range/reach. Optionally, overlapping signaling areas, i.e., areas reachable by multiple wired output interfaces may be identified in order to identify those areas that may be reachable by multiple wireless signals, e.g., a particularly wireless end station may be reachable with wired, intermediary signaling carried over different portions of the wired medium and wirelessly reachable from multiple, overlapping wireless antennas attached to two or more of the different portions of the wired medium.

Block 406 relates to determining end stations, user equipment and/or or wireless devices intended to receive wireless signaling from one of the end stations having wireline-to-wireless capabilities. The wireless devices may be identified as a function of signaling exchanged with one or more of the remote antenna units, such as when exchanging signals as part of a registration or authentication undertaken when attempting to access a corresponding wireless network (each remote antenna may be configured to support a wireless network and/or regulate the wireless devices enabled to receive wireless signals therefrom as a function of permissions granted during the registration/authentication). The wireless devices may be identified using Internet protocol (IP) addresses, media access control (MAC) addresses or other identifiers sufficiently unique to differentiate one wireless device from another. Wireless transmission related capabilities, operational constraints, messaging requirements and other information may be collected when identifying the wireless devices in order to assess the wireless capabilities of each device. Location and/or travel related information may be determined for the identified wireless devices using GPS coordinates, latitude and longitude, dead-reckoning, signaling strength (RSSI) and the like. Optionally, the collected information may be sufficient to identify a name, wireless capabilities/restrictions and location for each of the wireless devices within or likely to be within the corresponding service area. The wireless devices may be identified using low order modulations such as QPSK or BPSK to have a wider coverage and a larger pool of end stations with wireless and wireline capabilities associated with wireless devices which may provide a greater selection of association options between wireless and wireline devices Blocks 408, 410 relate to analyzing and assigning HFC wireline RF spectrum and wireless RF spectrum available within the service area to facilitate wired and/or wireless signaling. The present invention contemplates facilitating wired signaling, such as to the first end station, while also simultaneously supporting wireless signaling, such as to the second end station, where at least a portion of the wireless signaling is at least temporarily carried over the wired communication medium as an intermediary, wired signal. The RF spectrum assigned to facilitate this combined use of wired and wireless signaling may be dynamically selected in order to facilitate maximizing bandwidth and throughput of the system and/or according to operational constraints associated with the wireless signaling, i.e., certain portions of the system may have licensing restrictions or other requirements dictating use of particular portions of the RF spectrum. Optionally, the RF spectrum may be assigned and/or allocated differently depending on whether the corresponding signaling is traveling in a downlink (DL) away from the signal processor or an uplink (UL) direction toward the signal processor and/or on a per receiver (Rx) and transmitter (Tx) basis. For example, if more wireless devices are expected at a particular portion of the service area, more spectrum and/or other signaling resources may be allocated to that service area in comparison to other portions of the service area in order to ensure a desired quality of service.

Block 412 relates to determining control parameters for the signal processor. The signal processor may transmit signals through common RF port. The signal processor may have knowledge of which remote antenna unit end stations and which of their specific antennas are associated with the wireless UE end station it is targeting as the ultimate recipient of the signal. The signal processor can select the channel frequency on which to send the signal based on the remote antenna unit/antenna element mapping to the UE. Alternatively the signal processor doesn't have this knowledge but just transports this messages to the remote antenna units. The control parameters may be used to facilitate instructing and/or controlling the remote antennas to facilitate the contemplated wireless signaling within the constraints of the available RF spectrum. The wireless control parameters may define one-to-one groupings where a single antenna element within a remote antenna communications with a single wireless device and/or many-to-one groupings of two or more antenna elements within one or more remote antenna units communicate with individual wireless devices in order to provided enhanced spatial diversity, i.e., using spatially separate remote antennas to communicate with the same wireless device. The wireless control parameters by defining one to one grouping or one to many grouping could also be used generate beams to exclusively operate using beamforming or combining beamforming and spatial diversity for enhanced MIMO performance. The remote antennas groups may be dynamically assigned and re-assigned at certain intervals in order to provide continuous service for wireless devices moving in and out of the service area. Based on estimated traffic loading, geographical location and/or capabilities of the end station with wireline and wireless capabilities and the capabilities of a signal processor, pairing between signal processor and one or more remote antenna units may take place.

Block 414 relates to determining wired control parameters for the signal processor. The wired control parameters may be used to facilitate instructing and/or controlling the delivery of wired signals in the uplink and/or downlink directions. The control parameters may be constructed to facilitate allocating part of spectrum for the wired-only signaling and/or the intermediary signaling required to deliver the wireless signals choose the remote antennas. The wired control parameters may based on estimated traffic loading originated from the wired end stations and the wired end stations location in relation to the network topology, the capabilities of the wired end stations, number of channels and frequencies to carry traffic from these end stations are selected. The wired control parameters and the wireless control parameters may be coordinated and balanced relative to other system loads, bandwidth, etc. to facilitate allocating and dynamically adjust resources in a manner aimed at facilitating current and future signaling demands. A MAP or other network related control structures may be generated and distributed to the relevant signal processors (multiple signal processors may be used on per feed basis or per end device basis) to implement the desired controls.

Block 416 relates to generating mapping and/or other information sufficient to facilitate assigning wireless and/or wireline end stations to one or more signal processors. The signal processors may be configured to based on the frequencies and channels assigned to each device and its correspondence of such frequencies and channels according to the control parameters specified above. The mapping may assign signaling responsibilities for each end station requiring signaling to each available signal processor such that each of the feeds desired for transport are processed with at least on signal processor, and optionally one or more remote antennas in the event wireless transport is to follow wireline transport. The mapping may be dynamic at least in that a particular signal processor may support signaling for various end stations (e.g., user equipment and/or remote antennas) at intervals sufficient to facilitate essentially simultaneous communications with the multiple end stations.

Block 418 relates to configuring the signal processors based on current conditions, such as traffic, quantity of receiving end stations, capabilities, etc. These conditions may be periodically evaluated and the configuration adjusted as changes occur. Block 420 relates to the control and adjustment of the gain and/or tilt (frequency dependent gain) of the front end to obtain the desired power level to drive the optical transmitter of the HFC network. Block 422 relates to the control and the selection of the modulation order in the signal baseband processor to carry the appropriate amount of data in the channel. This may be determined based on channel conditions and the capabilities of the end station (UE) and the signal processor. In this manner, Blocks 420, 422 may included setting values or implementing other controls for the local oscillators and/or amplifiers being used to facilitate the signal processing contemplated herein. The related frequency, gain, tilt, loss, etc. may be dynamically adjusted depending on the signal feeds and/or the intended termination point (end station, user equipment, remote antenna unit, etc.) so as to achieve the noted benefits of the signal processors described above. Optionally, in the case of signal processor having capabilities to combine multiple signal components (e.g., h11+h22), an alternative Block 424 may be instigated to facilitate related controls. Block 424 performs an aggregation of signals that can be done using guardbands or alternative if the signals are frequency synchronized following a specific frequency spacing this aggregation is done without using guardbands resulting in a more efficient use of the spectrum While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multiple-input multiple-output (MIMO) signal processor comprising:
 a baseband processor configured to multiplex an input signal into at least a first signal part, a second signal part, a third signal part and a fourth signal part;
 a radio frequency integrated circuit (RFIC) configured to transmit the first signal part at a first frequency, the second signal part at a second frequency, the third signal part at a third frequency and the fourth signal part at a fourth frequency, each of the first, second, third and fourth frequencies being different;
 a front end including a summation device configured to join the first, second, third and fourth signal parts into an output signal following transmission from the RFIC; and
 a laser configured to transmit the output signal over at least one of a wireline communication medium and an optical communication medium, the laser modulating each of the first, second, third and fourth signal parts included in the output signal according to the corresponding first, second, third and fourth frequencies so as to provided frequency diverse long-haul transport of the output signal.

2. The signal processor of claim 1 wherein the front end includes a first filter for filtering the output signal, and thereby each of the first, second, third and fourth signal parts included therein, prior to output to the laser.

3. The signal processor of claim 2 wherein the front end includes a first amplifier for amplifying the output signal, and thereby each of the first, second, third and fourth signal parts included therein, after being filtered with the first filter and prior to output to the laser.

4. The signal processor of claim 3 wherein the front end includes a second filter, a third filter, a fourth filter and a fifth filter, the second filter filtering the first signal part prior to transport to the summation device, the third filter filtering the second signal part prior to transport to the summation device, the fourth filter filtering the third signal part prior to transport to the summation device and the fifth filter filtering the fourth signal part prior to transmission to the summation device.

5. The signal processor of claim 4 wherein the front end includes a second amplifier, a third amplifier, a fourth amplifier and a fifth amplifier, the second amplifier amplifying the first signal part after filtering with the second filter and prior to transport to the summation device, the third amplifier amplifying the second signal part after filtering with the third filter and prior to transport to the summation device, the fourth amplifier amplifying the third signal part after filtering with the fourth filter and prior to transport to the summation device and the fifth amplifier amplifying the fourth signal part after filtering with the fifth filter and prior to transmission to the summation device.

6. The signal processor of claim 5 wherein the filtering performed with each of the first, second, third, fourth and fifth filters and the amplifying performed with each of the first, second, third, fourth and fifth amplifiers are each individually controllable as a function of instructions received from a master controller, the master controller independently setting at least one of a passband for each of the first second, third, fourth and fifth filters and an amount of gain for each of the first second, third, fourth and fifth amplifiers according to a corresponding first set of values when at least a portion of the output signal is to travel through a first path within the at least one of the wireline communication medium and the optical communication medium and according to a corresponding second set of values when at least a portion of the output signal is to travel through a second path within the at least one of the wireline communication medium and the optical communication medium, the second path being different than the first path and the second set of values being different than the first set of values.

7. A multiple-input multiple-output (MIMO) signal processor comprising:
   a baseband processor configured to multiplex an input signal into at least a first signal part, a second signal part, a third signal part and a fourth signal part;
   a radio frequency integrated circuit (RFIC) configured to transmit the first signal part at a first frequency, the second signal part at a second frequency, the third signal part at a third frequency and the fourth signal part at a fourth frequency, each of the first, second, third and fourth frequencies being different;
   a front end including a summation device configured to join the first, second, third and fourth signal parts into an output signal following transmission from the RFIC; and
   wherein the baseband processor outputs each of the first, second, third and fourth signal parts at a fifth frequency and a digital interface of the RFIC thereafter separates each of the first, second, third and fourth signal parts according to digital in-phase and quadrature phase components such that the digital interface generates first digital in-phase and quadrature phase components for the first signal part, second digital in-phase and quadrature phase components for the second signal part, third digital in-phase and quadrature phase components for the third signal part and fourth digital in-phase and quadrature phase components for the fourth signal part.

8. The signal processor of claim 7 wherein the RFIC includes a separate digital-to-analog converter (DAC) for converting each of the first, second, third and fourth digital in-phase and quadrature phase components following output from the digital interface into corresponding first, second, third and fourth analog in-phase and quadrature phase components.

9. The signal processor of claim 8 wherein the RFIC includes a first oscillator, a second oscillator, a third oscillator and a fourth oscillator each individually controllable with a master controller, the master controller controlling the first oscillator according to a first oscillation sufficient for facilitating conversion of the first signal part from the fifth frequency to the first frequency, the second oscillator according to a second oscillation sufficient for facilitating conversion of the second signal from the fifth frequency to the second frequency, the third oscillator according to a third oscillation sufficient for facilitating conversion of the third signal part from the fifth frequency to the third frequency and the fourth oscillator according to a fourth oscillation sufficient for facilitating conversion of the fourth signal part from the fifth frequency to the fourth frequency, whereby each of the first, second, third and fourth oscillations are different.

10. The signal processor of claim 9 wherein the RFIC includes a separate mixer for each of the analog first, second, third and fourth in-phase and quadrature phase components, each mixer operating with no more than one of the first, second, third and fourth oscillators to facilitate transmitting the corresponding one of the analog first, second, third and fourth in-phase and quadrature phase components at the corresponding first, second, third and fourth frequencies, each analog in-phase and quadrature phase component thereafter being joined to form the first, second, third and fourth signal parts as transmitted at the first, second, third and fourth frequencies to the front end.

11. The signal process of claim 9 wherein the master controller selects the first, second, third and fourth frequencies as a function of spectrum available within a wired communication medium used to facilitate long-haul transport of the output signal from the front end.

12. The signal processor of claim 9 wherein the signal processor is configured to receive the input signal at the fifth frequency as a non-frequency diverse signal issued from at least one of:
   a cellular communication system, the input signal thereby being derived from a cellular signal transmitted over the cellular communication system;
   an Internet Service Provider (ISP), an application service provider or an over the top service provider, the input signal thereby being derived from data transmitted through one of the service providers; and
   a cable television service provider system, the input signal thereby being derived from television transmissions carried over the cable television service provider system.

13. The signal processor of claim 11 wherein the master controller selects the first, second, third and fourth frequencies to be within a first frequency range when the output signal is destined for a first service area and to be within a second frequency range when the output signal is destined for a second service area, the second frequency range being outside of the first frequency range.

14. A method of facilitating signal transmissions comprising:
   receiving an input signal desired for transmission to one or more service areas;
   multiplexing the input signal into at least a plurality of signal parts;
   modulation mapping each of the plurality of signal parts after the multiplexing;
   orthogonal frequency division multiplexing (OFDM) processing each of the plurality of signal parts after the modulation mapping;
   determining a plurality of center frequencies for the plurality of signal parts as a function of the one or more service areas such that the center frequency for each of the plurality of signal parts is different;
   instructing a plurality of local oscillators to facilitate mixing the plurality of signal parts at one of the plurality of center frequencies following the OFDM processing;
   transmitting each of the plurality of signal parts for long-haul transmission to the one or more service areas over at least one of a wireline communication medium and an optical communication medium after the mixing.

15. The method of claim 14 further comprising dynamically amplifying the plurality of signal parts as a function of instructions received from a master controller, the dynamic amplification characterized by adjusting gain and/or tilt (frequency dependent gain) for one of more of the plurality of signals parts as a function of losses associated with a path intended to be traveled for the corresponding one of the plurality of signals to reach the one or more service areas, including adjusting the gain and/or tilt for at least one of the plurality of signal parts after initially setting the corresponding gain and/or tilt when the corresponding signal path changes.

16. The signal processor of claim 11 wherein the master controller selects the first, second, third and fourth frequencies to be within a first frequency range when the output signal is in a downlink direction and to be within a second frequency range when the output signal is in an uplink direction, the second frequency range being outside of the first frequency range.

17. A multiple-input multiple-output (MIMO) signal processor comprising:
   a baseband processor configured to multiplex an input signal into at least a first signal part and a second signal part;
   a master controller configured to:
   i) determine a first service area for the first signal part and a second service area for the second signal part; and
   ii) determine a first frequency suitable for use in the first service area and a second frequency suitable for use in the second service area;
   a radio frequency integrated circuit (RFIC) configured to transmit the first signal part at the first frequency and the second signal part at the second frequency, the RFIC including a first oscillator for mixing the first signal part and a second oscillator for mixing the second signal part; and
   a front end configured to combine the first signal part and the second signal part into an output signal for output put to a radio frequency (RF) combiner.

18. The signal processor of claim 17 wherein the master controller instructs the first and second oscillators to facilitate mixing the first and second signal parts such that the first frequency is different from the second frequency.

19. The signal processor of claim 18 wherein the master controller selects the first frequency from a plurality of frequencies licensed within the first service area and selects the second frequency from a plurality of frequencies licensed in the second services areas such that the first and second frequencies are dynamically and individually selectable according to the first and second services areas associated therewith.

* * * * *